(12) United States Patent
Michl et al.

(10) Patent No.: US 7,737,234 B2
(45) Date of Patent: Jun. 15, 2010

(54) CATALYSTS FOR RADICAL POLYMERIZATION

(75) Inventors: Josef Michl, Boulder, CO (US); Kamesh Vyakaranam, Pearland, TX (US); Stefanie Koerbe, Garching (DE)

(73) Assignee: The Regents of the University of Colorado, a body corporate, Denver, CO (US)

( * ) Notice: Subject to any disclaimer, the term of this patent is extended or adjusted under 35 U.S.C. 154(b) by 0 days.

(21) Appl. No.: 11/997,895

(22) PCT Filed: Aug. 4, 2006

(86) PCT No.: PCT/US2006/003047

§ 371 (c)(1),
(2), (4) Date: Aug. 20, 2008

(87) PCT Pub. No.: WO2007/016700

PCT Pub. Date: Aug. 2, 2007

(65) Prior Publication Data

US 2009/0069520 A1   Mar. 12, 2009

Related U.S. Application Data

(60) Provisional application No. 60/705,648, filed on Aug. 4, 2005, provisional application No. 60/743,896, filed on Mar. 29, 2006.

(51) Int. Cl.
*C08F 4/52* (2006.01)
*C08F 30/06* (2006.01)
*C07F 5/02* (2006.01)

(52) U.S. Cl. .......................... 526/178; 526/196; 568/3; 568/4; 568/5

(58) Field of Classification Search .................. 526/178, 526/239; 568/4, 3–5
See application file for complete search history.

(56) References Cited

U.S. PATENT DOCUMENTS 3,109,031 A   10/1963   Goldstein
3,816,380 A * 6/1974   Reed, Jr. .................. 526/215

(Continued)

FOREIGN PATENT DOCUMENTS

| WO | WO 98/43983 | 10/1998 |
| WO | WO 02/079210 | 10/2002 |
| WO | WO 03/051943 | 6/2003 |
| WO | WO 2004/106893 | 12/2004 |

OTHER PUBLICATIONS

Bamford et al. (1957) "Studies in Polymerization XII. Salt Effects on the Polymerization of Acrylonitrile in Non-Aqueous Solution," *Proc. Roy. Soc. London Series A Math. Phys. Sci.* 241:364-375.

(Continued)

*Primary Examiner*—Milton I Cano
*Assistant Examiner*—Brieann R Fink
(74) *Attorney, Agent, or Firm*—Greenlee, Winner and Sullivan, P.C.

(57) ABSTRACT

Provided is a method for polymerizing a polymer precursor, comprising: contacting a polymer precursor with a lithium carborane catalyst and an initiator under polymerizing conditions. A reaction solvent may be used, but is not necessary. Also provided is a method of preparing lithium carborane polymers, comprising: contacting a lithium carborane polymer precursor having a terminal alkenyl or alkynyl group with an initiator and an optional reaction solvent under polymerizing conditions. Functionalized carborane anions are also provided.

35 Claims, 12 Drawing Sheets

U.S. PATENT DOCUMENTS

| | | | |
|---|---|---|---|
| 4,046,745 | A | 9/1977 | Selman et al. |
| 4,129,558 | A | 12/1978 | Selman et al. |
| 4,751,276 | A | 6/1988 | Chung |
| 5,173,464 | A | 12/1992 | Pettijohn et al. |
| 5,191,052 | A | 3/1993 | Welborn, Jr. |
| 5,198,401 | A | 3/1993 | Turner et al. |
| 5,317,058 | A * | 5/1994 | Dougherty et al. ............ 525/64 |
| 5,504,048 | A | 4/1996 | Shamshoum et al. |
| 5,688,887 | A | 11/1997 | Bagheri et al. |
| 5,731,470 | A | 3/1998 | Michl et al. |
| 5,739,073 | A | 4/1998 | Shamshoum et al. |
| 6,008,307 | A | 12/1999 | Shaffer |
| 6,130,357 | A | 10/2000 | Strauss et al. |
| 6,180,829 | B1 | 1/2001 | Strauss et al. |
| 6,265,504 | B1 | 7/2001 | Liu et al. |
| 6,451,585 | B1 | 9/2002 | Kirschner |
| 6,541,585 | B2 | 4/2003 | Johnson et al. |
| 6,559,251 | B1 | 5/2003 | Wang et al. |
| 6,693,155 | B1 | 2/2004 | Meverden et al. |
| 6,713,582 | B2 | 3/2004 | DiMaio et al. |
| 6,800,705 | B2 | 10/2004 | Barbotin et al. |
| 6,828,268 | B1 | 12/2004 | McDaniel et al. |
| 2003/0149203 | A1 | 8/2003 | DiMaio et al. |
| 2004/0157752 | A1 | 8/2004 | DiMaio et al. |
| 2005/0027086 | A1 | 2/2005 | Kennedy et al. |
| 2007/0294936 | A1 | 12/2007 | Colucci |
| 2009/0018298 | A1 | 1/2009 | Michl et al. |

OTHER PUBLICATIONS

Bartoů et al., eds., (1988) "Monomer—Lewis Acid and Propagating Radical—Lewis Acid Complexes," In; *Complexes in Free Radical Polymerization*, Elsevier: Amsterdam, The Netherlands, pp. 148-165 and pp. 127-129.

Braun et al. (1986) "Die Polaritä t etherischer Lithiumperchlorat-Lösungen," *Chem. Ber.* 119:1269-1274.

Clark, T. (1986) "Radical Addition to Alkene-Metal Cation Complexes," *J. Chem. Soc. Chem. Commun.* 24:1774-1776.

Clarke et al. (2004) "Silver-Phosphine Complexes of the Highly Methylated Carborane Monoanion [*closo*-1-H-CB$_{11}$Me$_{11}$]$^-$," *J. Am. Chem. Soc.* 126(5):1503-1517.

Collomb et al. (1984) *Cationic Polymerization and Related Processes*, Goethals, E.J. Ed., Academic Press: New York, pp. 49-67.

Denisov et al. (2000) "Free Radical Addition: Factors Determining the Activation Energy," *Russian Chem. Rev.* 69(2):153-164.

Fischer et al. (2001) "Factors Controlling the Addition of Carbon-Centered Radicals to Alkenes—An Experimental and Theoretical Perspective," *Angew. Chem. Int. Ed.* 40:1340-1371.

Flemmig et al. (2004) "The Cyclopropylmethyl—3-Butenyl Rearrangement on Mo(110): A Radical Clock on a Surface," *J. Phys. Chem. A* 108:2972-2981.

Franken et al. (2001) "Preparation of [*closo*-CB$_{11}$H$_{12}$]$^-$ By Dichlorocarbene Insertion Into [*nido*-B$_{11}$H$_{14}$]$^-$," *Collect. Czech. Chem. Commun.* 66:1238-1249.

Fu et al. (2004) "Solvent Effect is not Significant for the Speed of Radical Clock," *Res. Chem. Intermed.* 30(3):279-286.

Gibson et al. (2003) "Advances in Non-Metallocene Olefin Polymerization Catalysis," *Chem. Rev.* 103(1):283-316.

Griller et al. (1980) "Free-Radical Clocks," *Acc. Chem. Res.* 13(9):317-323.

Horn et al. (2003) "Does Metal Ion Complexation Make Radical Clocks Run Fast," *J. am. Chem. Soc.* 125:2809-2816.

Ingleson et al. (Mar. 15, 2005) "B-C Activation in Highly Alkylated Carborane Monoanions Partnered with Cationic Transition Metal Fragments: Observations and Comments," *Inorg. Chim Acta* 358(5):1571-1580.

International Search Report, Corresponding to International Application No. PCT/US06/30470, Mailed Mar. 28, 2008.

Janouěek et al. (2004) "Li$^+$-Induced σ-Bond Metathesis: Aryl for Methyl Exchange on Boron in a Methylated Monocarbadodecaborate Anion," *J. Am. Chem. Soc.* 126(13):4060-4061.

Jelínek et al. (1993) "New Weakly Coordinating Anions. 2. Derivatization of the Carborane Anion CB11H12-," *Inorg. Chem.* 32(10):1982-1990.

Johnson et al. (1995) "New Pd(II)- and Ni(II)-Based Catalysts for Polymerization of Ethylene and .alpha.-Olephins," *J. Am. Chem. Soc.* 117(23):6414-6415.

King et al. (1999) "Cation-πInteractions in the Solid State: Crystal Structures of M$^+$(Benzene)$_2$CB$_{11}$Me$^-_{12}$(M=T1, Cs, Rb, K, Na) and Li$^+$(Toluene) CB$_{11}$Me$^-_{12}$," *Collect. Czech. Chem. Commun.* 64:1001-1012.

King et al. (1996) "Dodecamethylcarba-*closo*-dodecaboranyl (CB$_{11}$Me$_{12}$), a Stable Free Radical," *J. Am. Chem. Soc.* 118(44):10902-10903.

King et al. (Dec. 2001) "Alkylated Carborane Anions and Radicals," *Chem. Innov.* 31(12):23-31.

King et al. (1996) "Dodecamethylcatba-*closo*-dodecaborate(−) Anion, CB$_{11}$Me$_{12}$-," *J. Am. Chem. Soc.* 118(13):3313-3314.

Korchowiec et al. (1998) "Mechanism of Addition of Fluoromethyl Radicals to Fluoroethylenes," *J. Phys. Chem. A* 102:6682-6689.

Krossing et al. (2004) "Noncoordinating Anions—Fact or Fiction? A Survey of Likely Candidates," *Angew. Chem. Int. Ed.* 43:2066-2090.

Kumar, A. (2001) "Salt Effects on Diels-Alder Reaction Kinetics," *Chem. Rev.* 101(1):1-20.

Lutz et al. (2003) "Synthesis of Well-Defined Alternating Copolymers by Controlled/Living Radical Polymerization in the Presence of Lewis Acids," *Macromolecules* 36(9):3136-3145.

Lutz et al. (2004) "Controlled/Living Radical Polymerization of Methacrylic Monomers in the Presence of Lewis Acids: Influence on Tacticity," *Macromol. Rapid Commun.* 25(3):486-492.

Massey et al. (Sep. 1964) "Perfluorophenyl Derivatives of the Elements: I. Tris(pentafluorophenyl)boron," *J. Organomet. Chem.* 2(3):245-250.

McKnight et al. (1998) "Group 4 *ansa*-Cyclopentadienyl-Amido Catalysts for Olefin Polymerization," *Chem. Rev.* 98(7):2587-2598.

Moad et al. (1984) "Fate of the Initiator in the Azobisisobutyronitrile-Initiated Polymerization of Styrene," *Macromolecules* 17(5):1094-1099.

Moss et al. (2001) "LiCB$_{11}$Me$_{12}$: A Catalyst for Pericyclic Rearrangements," *Org. Lett.* 3(15):2375-2377.

Newcomb, M. (Feb. 5, 1993) "Competition Methods and Scales for Alkyl Radical Reaction Kinetics," *Tetrahedron* 49(6):1151-1176.

Olleta et al. (2004) "Transition-State-Theory Calculations for Reactions of O($^3$P) with Halogenated Olefines," *Phys. Chem. Chem. Phys.* 6:5362-5369.

Petit et al. (May 1999) "Polymerization of Some Terminal Alkynes by Ziegler-Natta Catalyst Systems: Fe(RCOO)$_3$-AlEt$_3$," *Eur. Polym. J.* 35(5):953-963.

Pospíšil et al. (Sep. 1, 1998) "Voltammetry in Benzene Using Lithium Dodecamethylcarba-*closo*-dodecaborate, LiCB$_{11}$Me$_{12}$, as a Supporting Electrolyte: Reduction of Ag$^+$," *Electrochim. Acta.* 44(1):103-108.

Ray et al. (2003) "Synthesis of Isotactic Poly(*N*-isopropylacrylamide) by RAFY Polymerization in the Presence of Lewis Acid," *Macromolecules* 36(3):543-545.

Reed, C.A. (1998) "Carboranes: A New Class of Weakly Coordinating Anions for Strong Electrophiles, Oxidants, and Superacids," *Acc. Chem. Res.* 31:133-139.

Renaud et al. (1998) "Use of Lewis Acids in Free Radical Reactions," *Angew. Chem. Int. Ed.* 37:2562-2579.

Schürer et al. (1998) "Is the Calcium-Ion Catalysis of Biological Reoxidation of Reduced PQQ Purely Electrostatic," *Chem. Commun.* :257-258.

Scollard et al. (1996) "Polymerization of α-Olefins by Chelating Diamide Complexes of Titanium," *Macromolecules* 29(15):5241-5243.

Scollard et al. (1996) "Living Polymerization of α-Olefins by Chelating Diamide Complexes of Titanium," *J. Am. Chem. Soc.* 118(41):10008-10009.

Sekušak et al. (1998) "Reactivity and Regioselectivity of Hydroxyl Radical Addition to Halogenated Ethenes," *J. Phys. Chem. A* 102:1583-1594.

Shaik et al. (2004) "The 'Rebound Controversy': An Overview and Theoretical Modeling of the Rebound Step in C-H Hydroxylation by Cytochrome P450," *Eur. J. Inorg. Chem.* :207-226.

Strauss, S.H. (1993) "The Search for Larger and More Weakly Coordinating Anions," *Chem. Rev.* 93:927-942.

Tsang et al. (2000) "A Novel Synthetic Route to Peralkylated Carborane Anions, 1-H-$CB_9Me_9^-$ and 1-H-$CB_{11}R_{11}^-$(R=Me,Et)," *Chem. Commun.* 19:1839-1840.

Van Speybroeck et al. (2005) "Ab Initio Study of Free-Radical Polymerizations: Cost-Effective Methods to Determine the Reaction Rates," *ChemPhysChem* 6:180-189.

Vyakaranam et al. (2006) "$Li^+$-Catalyzed Radical Polymerization of Simple Terminal Alkenes," *J. Am. Chem. Soc.* 128(17):5610-5611.

Vyakaranam et al. (2006) "Air-Initiated Radical Polymerization of Lithium Salts of ω-(Undecamethylcarba-*closo*-dodecaboran-1'-yl)alk-1-enes, $CH_2=CH(CH_2)_{n-2}C(BMe)_{11}^-Li^+$," *J. Am. Chem. Soc.* 128(17):5680-5656.

Vyakaranam et al. (2004) "A New Type of Intermediate, $C^+(BCH_3)_{11}$-↔$C(BCH_3)_{11}$, in a Grob Fragmentation Coupled with Intramolecular Hydride Transfer. A Nonclassical Carbocation Ylide or a Carbenoid," *J. Am. Chem. Soc.* 126:15795-15801.

Vyakaranam et al. (2006) "Preparation of Undecamethylated and Hexamethylated 1-Halocarba-closo-dodecaborate Anions," *Heteroatom Chem.* 17:217-.

Wong et al. (1998) "Radical Addition to Alkeses: Further Assessment of Theoretical Procedures," *J. Phys. Chem. A* 102:2237-2245.

Written Opinion, Corresponding to International Application No. PCT/US06/30470, completed on Feb. 18, 2008.

Yates et al. (1987) "Spontaneous Intramolecular Hydrogen Migration in Ionized Ethane-1,2-diol," *J. Chem. Soc. Chem. Commun.* 3:204-205.

Zharov et al. (2000) "Crystal Structure of *n*-$Bu_3Sn^+$ $CB_{11}Me_{12}^-$," *J. Am. Chem. Soc.* 122(41):10253-10254.

Zharov et al. (2004) "Metal Cation-Methyle Interactions in $CB_{11}Me_{12}^-$ Salts of $Me_3Ge^+$, $Me_3Sn^+$, and $Me_3Pb^+$," *J. Am. Chem. Soc.* 126(38):12033-12046.

Zharov et al. (2006) "$CB_{11}Me_{11}$ Boronium Ylides: Carbo-*closo*-dodecaboranes with a Naked Boron Vertex," *J. Am. Chem. Soc.* 128(18):6089-6100.

Harkki O. et al. (1999) "Copolymerization of ethylene with 1-hexene or 1-hexaddecene over siloxy-substituted metallocene catalysts," Macromolecular Chem. Physics, vol. 200(6):1561-1565 Jun.

Koivumaki J. (1995) "Copolymerization of ethylene and 1-octadecene with the CP2ZRZL2/MAO and CP2HFCL2-MAO Catalyst SYSTems," Polymer Bull. 34(4):413-418, Apr.

EP Supplemental Search Report and Opinion, for EP 06 813298, Search Completed Nov. 11, 2009.

* cited by examiner

CATALYSTS FOR RADICAL POLYMERIZATION

CROSS-REFERENCE TO RELATED APPLICATIONS

This application is a 371 national stage of PCT/US/2006/030470, filed Aug. 4, 2006, and takes priority under 37 CFR 119(e) to U.S. provisional application Ser. No. 60/705,648 filed Aug. 4, 2005, and U.S. provisional application Ser. No. 60/743,896, filed Mar. 29, 2006, each of which applications are incorporated by reference herein in its entirety.

STATEMENT REGARDING FEDERALLY SPONSORED RESEARCH OR DEVELOPMENT

This invention was made, at least in part, with funding from the National Science Foundation under grant numbers CHE-0446688 and CHE-0140478. Accordingly, the U.S. government may have certain rights in this invention.

BACKGROUND OF THE INVENTION

Terminal alkenes that do not contain activating substituents such as —O-alkyl, aryl (such as phenyl in styrene), cyano, carboxylic ester, or amide near the double bond are difficult to polymerize. These unactivated terminal alkenes are ordinarily stable indefinitely at room temperature in air. Much effort has been directed at improving the polymerization of unactivated terminal alkenes, such as the use of coordinatively unsaturated transition metal catalysts (McKnight and Waymouth 1998; Gibson and Spitzmesser 2003), the use of high pressure and temperature, and in some cases low-temperature cationic polymerization (Cheradame 1984; Sangalov et al. 2001). However, these methods are difficult to carry out and often produce low molecular weight polymers (Moad and Solomon 1995).

An improved method of polymerizing unactivated alkenes is needed.

SUMMARY OF THE INVENTION

A method is provided for polymerizing a polymer precursor, comprising the step of contacting the polymer precursor with a lithium salt catalyst in the presence of an initiator under polymerizing conditions. A reaction solvent may be used, but is not necessary. More particularly, a method is provided for polymerizing a polymer precursor, comprising contacting the polymer precursor with a lithium salt of an anionic borane or heteroborane (e.g., carborane) catalyst in the presence of an initiator and optionally in a reaction solvent under polymerizing conditions. In specific embodiments, the polymer precursor is an unactivated terminal alkene or alkyne.

Also provided is a method for forming a low molecular weight polymer, comprising contacting one or more polymer precursors with a lithium salt of an anionic borane or heteroborane catalyst in the presence of an initiator and optionally in a reaction solvent under low molecular weight producing polymerizing conditions. In specific embodiments, the method is employed to form a low molecular weight copolymer by copolymerizing two or more different polymer precursors.

Also provided is a method for forming a high molecular weight polymer, comprising contacting one or more polymer precursor with a lithium salt of an anionic borane or heteroborane catalyst and an initiator and an optional reaction solvent under high molecular weight producing polymerizing conditions. In specific embodiments, the method is employed to form a high molecular weight copolymer by copolymerizing two or more different polymer precursors.

Also provided is a method for polymerizing a polymer precursor, comprising contacting an unactivated terminal alkene or alkyne with a poorly solvated lithium cation in the presence of an initiator and optionally in a reaction solvent under polymerizing conditions.

More particularly, a method is provided for preparing polymers containing covalently attached lithium carboranes, comprising contacting a lithium carborane polymer precursor having a terminal alkenyl or alkynyl group with an initiator and optionally in a reaction solvent under polymerizing conditions. Without being bound to any particular theory, it is believed that the lithium cation in the lithium carborane polymer precursor acts as a catalyst to self-polymerize the lithium carborane polymer precursor. Thus, the lithium carborane catalyst may include the polymer precursor in the same molecule. For example, the lithium carborane catalyst may contain a terminal double or triple bond.

The invention further provides high molecular weight polymers having weight average molecular weights above 10,000 (including those above 100,000) and polydispersities between 2 and 3 prepared by methods of this invention. In specific embodiments, the invention provides high molecular weight copolymers polymers having weight average molecular weights above 10,000 (including those above 100,000) and polydispersities between 2 and 3 prepared by methods of this invention. The invention also provides low molecular weight polymers having weight average molecular weights below 10,000 (including below 5,000) and polydispersities between 2 and 3 are also provided. In specific embodiments, the invention provides low molecular weight copolymers polymers having weight average molecular weights below 10,000 (including those below 5,000) and polydispersities between 2 and 3 prepared by methods of this invention.

Polymers and copolymers of this invention can be prepared with various terminal groups, for example, hydroxyl, —$CH_2OH$ or amino terminal groups. The terminal groups can be chemically functionalized using methods known in the art and described herein. For example, a terminal hydroperoxy can be converted to hydroxy with iodine. One or both terminal groups can be functionalized, and the functionalization can be the same or different. If both terminal groups are functionalized, one of the end groups comes from the chain initiator and the other end group comes from a chain terminator.

In specific embodiments, the invention provides polymers containing covalently attached carborane, borane or heteroborane anions or salts thereof which are made by the methods of this invention. The invention provides polymers or copolymers having two or more covalently attached borane, heteroborane or carborane anions or salts thereof. These polymers are generated by self-polymerization of lithium carborane, borane or heteroborane precursors which have a terminal alkene or alkyne group. Copolymers are formed by polymerization of lithium carborane, borane or heteroborane precursor and one more polymerizable monomers or by polymerization of two or more lithium carborane, borane or heteroborane precursors are also provided in this invention. In specific embodiments, the invention provides polymers and copolymers of formulas:

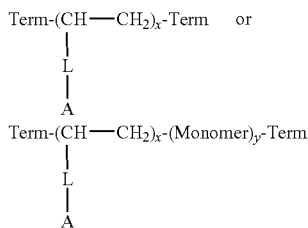

where Term represents a terminal group which includes terminal groups noted herein (e.g., H, OH, $NR_2$, OR, where R is an alkyl or aryl group) or functional groups reacted with those terminal groups; A is a carborane, borane or heteroborane anion (or salt thereof, including Li salts, and non-Li salts including, $Na^+$, $K^+$, $Cs^+$ salts or ammonium cation salts, etc.); L is a linker between the terminal alkene that is polymerized and the anion, which is typically a alkylene e.g., $-(CH_2)_n-$ or alkenylene (having a C=C double bond in the linker) diradical, x and y are the number of repeating units in the polymer or copolymer. In specific embodiments, Monomer is the repeating unit formed from copolymerization of a terminal alkene, terminal alkyne, alkenyl acetate, ethyl acetate, or methyl methacrylate.

The copolymer can be a random or block copolymer as these terms are understood in the art. The polymers and copolymers may be relatively short with x and y independently ranging from 2-50, 2-20, 2-10, 10-50 and other subranges thereof. The polymers and copolymers may be generally longer with x and y ranging independently from 50-several hundred, 10-200, 50-200, 25-200 and other subranges thereof.

In specific embodiments, the method of the invention can be employed to copolymerization one or more unactivated alkenes with monomers having activating groups, such as the copolymerization of one or more unactivated alkenes with an alkenyl acetate (e.g., vinyl acetate) or an alkyl acrylate (e.g., ethyl acrylate). Copolymerization of this invention can be carried out employing all the polymer precursors listed herein, as well as any other monomer that is polymerized by the methods of the invention. Examples of copolymers include those copolymers formed from the group of polymer precursors consisting of branched or straight-chain terminal alkenes, activated terminal alkenes, branched or straight-chain terminal alkynes, and alkyl silanes carrying terminal alkenes or alkynes. Specific examples of polymer precursors useful in forming copolymers include isobutylene, 1-hexene, vinyl acetate, ethyl acrylate, methyl methacrylate, and vinyltrimethylsilane. The copolymers prepared herein can contain any desired ratio of the polymer precursors. The desired ratios of the polymer constituents in copolymer products are provided by varying the percentages of the polymer precursors used, as is known in the art. Random and block copolymers can be formed using the methods described herein. Block copolymers can be formed using living radical polymerization, as known in the art.

A feature of the present invention is the ability to prepare polymers and copolymers (either high or low molecular weight polymers or copolymers) from terminal alkenes and alkynes under milder reaction conditions than is currently possible, e.g. without the use of increased pressure or at significantly lower temperatures. In one embodiment, ambient pressure can be used. In one embodiment, ambient temperature may be used. In another embodiment, a temperature of between about 50 and 100° C. can be used.

In specific embodiments, the methods herein employ lithium carborane catalysts including those having a carborane anion of formula: $(CB_qR_{m'})^-$, where R is a hydrogen or an alkyl group having from 1 to 10 carbon atoms, and each R, independent of other R in the carborane, may be the same or different, where q is an integer from 5 to 11 and m' is an integer from 5-16. R can be small alkyl groups having from 1 to 6 carbon atoms. Other useful carborane anions that can be present in the lithium carborane catalyst include: $-C(BR)_9^-$, or $RC(BR)_{12}^-$; where R is a hydrogen or an alkyl group having from 1 to 10 carbon atoms, and each R, independent of other R, may be the same or different. Specific examples of carborane anions that can be present in the lithium carborane catalyst are those selected from the group consisting of: $CB_{11}R_{12}^-$; $CB_{11}Me_{12}^-$; $HCB_{11}R'_{11-x}R''_x^-$ where x is 1-11 and R' and R" are selected from hydrogen and alkyl groups and are different; $HCB_{11}Et_9Me_2^-$; $CB_{11}R'''R'_{11-x}R''_x^-$, where x is 1-11 and R''', R' and R" are selected from hydrogen and alkyl groups and are different; $CB_{11}HxEt_9Me_2^-$ (where Hx represents n-hexyl); $HCB_{11}Me_{11}^-$; $CB_{11}H_6I_6^-$; and $CB_{11}H_{12}^-$.

In other specific embodiments, the methods herein employ a lithium salt of an anionic borane as the catalyst wherein the anionic borane is a radical anion (e.g., an alkylated boron anion), with an open shell.

Polymer precursors useful in the methods herein include, among others, molecules having at least one terminal double bond, alkenes that contain at least one terminal double bond and do not contain an activating group near the double bond (unactivated terminal alkenes), alkenes with a terminal double bond and having 2-40 carbon atoms; alkenes with a terminal double bond and having 2-20 carbon atoms; alkenes with a terminal double bond and having 2-10 carbon atoms; and straight chain alkenes with a terminal double bond and between 1-40 carbon atoms ("simple alkenes"). Some examples of polymer precursors are ethylene, propylene, 1-butene, 1-pentene, 1-hexene, 1-heptene, and others containing straight or branched alkyl chains with a terminal double bond and having 2-40 carbon atoms (or 1-20 carbon atoms, or 1-20 carbon atoms). Additionally useful polymer precursors are straight chain alkynes with a terminal triple bond, such as acetylenes, for example 1-hexyne. Useful alkynes include those having 2-40 carbon atoms, those having 2-20 carbon atoms and those having 2-10 carbon atoms. Some particular examples of useful polymer precursors are: $CH_2=CH_2$; $MeCH=CH_2$; $Me_2C=CH_2$; $EtCH=CH_2$; $PrCH=CH_2$ $n-BuCH=CH_2$; $Me_3SiCH=CH_2$. Another class of useful polymer precursors are those with formula: $CH_2=CR-(CR_2)_n-CR_3$, where n is an integer and each R, independent of other R's in the molecule, are the same or different and are selected from the group consisting of: H; alkyl, silyl alkyl (e.g., $-SiR'_3$ where each R' is independently an alkyl group) and halogen, including F, Cl, Br. Other examples of polymer precursors include branched alkenes having a terminal double bond such as isobutylene and isoprene, and ring-containing structures having a terminal double bond such as styrene. Yet another class of useful polymer precursors are dienes.

The inventive method can also be employed with lithium carborane, borane or heteroborane polymer precursors which contain a terminal alkene or alkyne. Specific examples of lithium carborane polymer precursors include compounds [n]2:

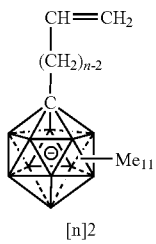

where n is an integer greater than 2. In one group of lithium carborane polymer precursors, n=2-7. In one group of lithium carborane polymer precursors, n is less than 12. In one group of lithium carborane polymer precursors, n is an integer up to and including 30. One example of lithium carborane polymer precursor is

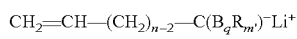

where R is a hydrogen or an alkyl group having from 1 to 10 carbon atoms, wherein each R, independent of other R, may be the same or different; n is an integer greater than 2; q is an integer from 5 to 11; and m' is an integer from 5-16. In one embodiment, n is 5-7. Lithium borane or heteroborane precursors would include borane or heteroborane anions as described herein as useful in preparing $Li^+$ catalysts for use in polymerization reactions herein.

The invention provides improved methods for making lithium carborane polymer precursors which contain a terminal alkene or alkyne, such as $CH_2=CH-(CH_2)_{n-2}-C(B_qR_{m'})^-Li^+$, as defined above.

The method of this invention can be practiced employing a reaction solvent which can be a single component solvent or a mixture of components. The reaction solvent dissolves the lithium salt to an appreciable extent without forming appreciable complexes with the lithium salt and without deactivating the lithium salt. It is believed the solubility of the lithium salt in the reaction medium is important in successful catalysis. Preferably the reaction solvent does not bind to the lithium cation so that it solvates to compete with the alkene. $Li^+$ complexing agents such as tetrahydrofuran (THF) and other ethers deactivate the $Li^+$ and are not preferred solvents. Radical inhibitors are also not preferred as solvent components because they scavenge radicals. A reaction solvent with a polarizable π-system provides very weak stabilization of the $Li^+$ salt, which is desirable for solubility without significant detrimental affect upon reactivity. Solvents are typically liquid at reaction conditions. Solvents may include oils including silicone oil.

The polymer precursor can also be placed in contact with a solid lithium salt and an initiator in a suitable reactor and pressurized to above atmospheric pressure to form a polymer with or without a solvent.

The lithium carborane containing polymers described herein are useful in Li ion batteries, among other uses. Some of the polymers prepared using the methods of the invention have been tested and have conductivities in the range of microsiemens/cm.

Other aspects and embodiments of the invention will be apparent from the additional description, examples and figures herein.

DETAILED DESCRIPTION OF THE INVENTION

Figure 1:
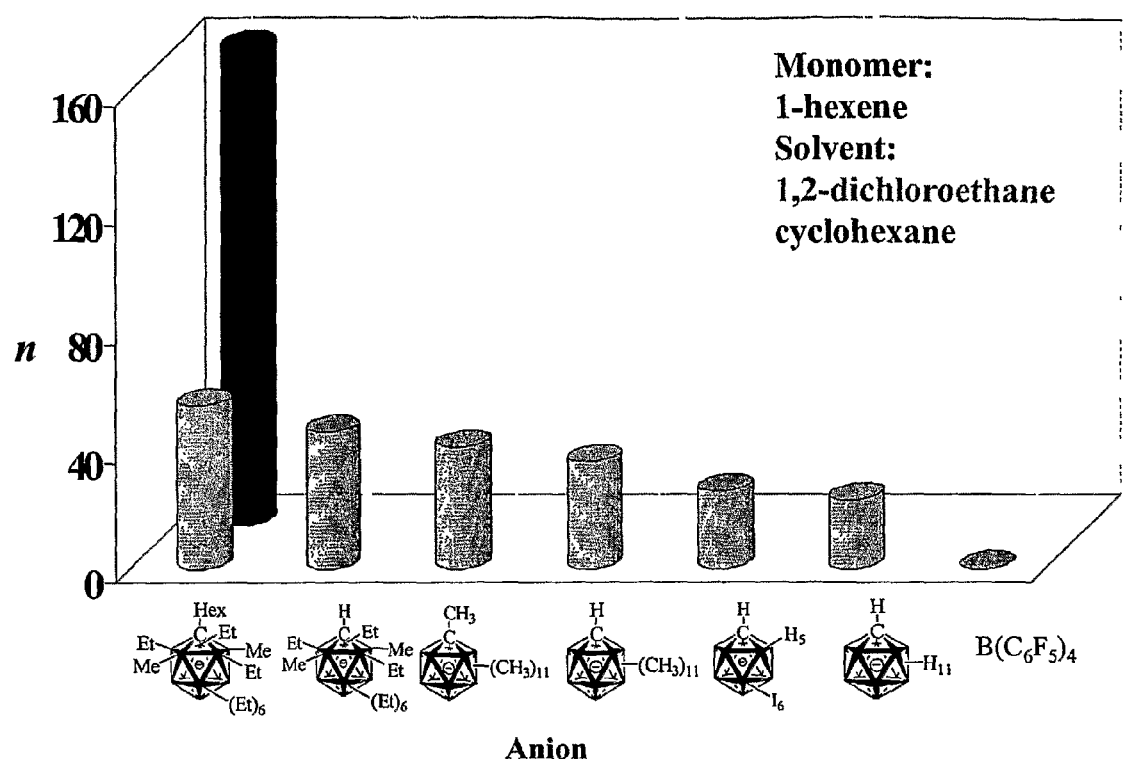
FIG. 1 shows the degrees of polymerization (n) of 1-hexene in two solvents (1,2-dichloroethane in front, and cyclohexane in back) from lithium carborane catalysts comprising lithium cation and the anions shown below the Figure.
Figure 2:
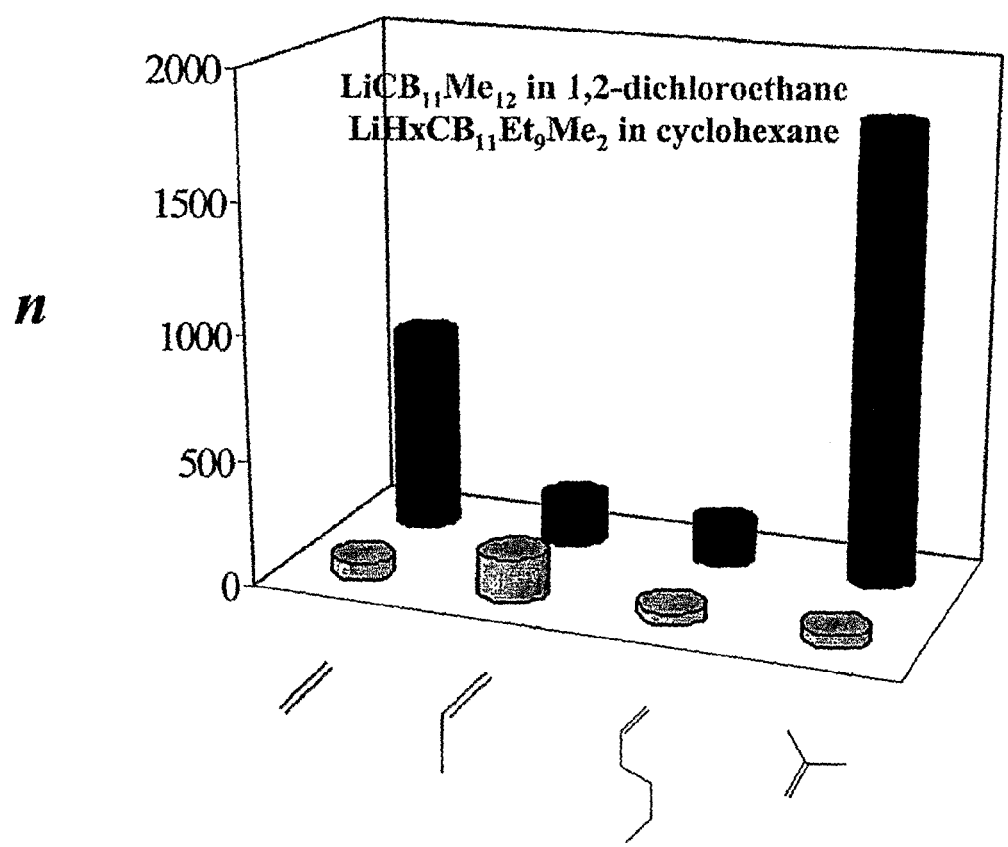
FIG. 2 shows the degree of polymerization for polymers prepared from four alkenes, using two different catalyst/solvent systems: $LiCB_{11}Me_{12}$ in 1,2-dichloroethane (front); and $LiHxCB_{11}Et_9Me_2$ in cyclohexane (back). The polymerizations were conducted as described in Example 1 employing DTBP as the initiator.

The invention relates generally to methods and reagents for carrying out polymerization reactions.

Definitions

As used herein, the term "polymer" includes molecules of varying sizes having at least two repeating units. Most generally polymers include copolymers which may in turn include random or block copolymers. Specifically, "polymer" includes oligomers (molecules having from 2-10 repeating units). Polymers formed using the invention have varying degrees of polymerization (number of monomer units attached together), for example from 2-10; 11-25; 26-100; 101-250; 251-500; 501-750; 751-1000; 1,000-2,000; and all individual values and ranges and sub-ranges therein, and other degrees of polymerization. As known in the art, the degree of polymerization can be modified by changing polymerizing conditions.

As known in the art, there are different measures of molecular weight of polymers: average molecular weight ($M_w$, the weight-average molecular weight, or $M_n$, the number-average molecular weight) and molecular weight distribution ($M_w/M_n$, a measure of polydispersity because $M_w$ emphasizes the heavier chains, while $M_n$ emphasizes the lighter ones). The number average molecular weight is the average of the molecular weights of the individual polymers in a sample. The number average molecular weight is determined by measuring the molecular weight of n polymer molecules, summing the weights, and dividing by n. The weight average molecular weight ($M_w$) is calculated by $$\overline{M}_w = \frac{\sum_i N_i M_i^2}{\sum_i N_i M_i}$$

where $N_i$ is the number of molecules of molecular weight $M_i$. The polydispersity index (PDI) is a measure of the distribution of molecular weights of the polymer and is the weight average molecular weight divided by the number average molecular weight. As the chains approach uniform chain length, the PDI approaches 1. The degree of polymerization is the total molecular weight of the polymer divided by the molecular weight of the monomer and is a measure of the number of repeat units in an average polymer chain. As described elsewhere herein, the average molecular weights of the polymers produced can vary, depending on the polymerizing conditions, and other factors, as known in the art.

As used herein, a "lithium salt" is a compound comprising a lithium cation and an anion. In one embodiment, the anion is a carborane anion. The carborane anion can vary, as shown herein. As used herein, a "lithium salt of an anionic borane or heteroborane" is a lithium salt where the anion is a borane or heteroborane, including a carborane. A heteroborane is a borane in which one o or more of the boranes is replaced with an atom other than boron, particularly C, Si, Ge, Sn, Pb, N, P, As, Sb or Bi. Preferred heteroboranes are monoheteroboranes, where one boron of the borane is replaced with the non-boron atom. Dependent upon the atom used to replace boron, the substituted atom may be bonded to a substituent R groups (as in carboranes). Preferred monoheteroboranes are carboranes. When the carborane anion is present in the lithium salt, the term "lithium salt" is intended to be equivalent to "lithium carborane salt". The lithium salts used in the invention should be at least partly soluble in the reaction solvent, if solvent is used. Useful lithium salts include lithium salts of weakly coordinating and lipophilic anions including carboranes, heteroboranes and boranes, as well as other lithium salts of weakly coordinating and lipophilic anions.

In general it is believed that a "naked" $Li^+$ functions for catalysis in the methods herein. In order to generate the "naked" $Li^+$, the cation is combined with a very lipophilic and relatively non-coordinating anion, such as the borane, heteroborane and carboborane ions described herein which does not deactivate $Li^+$ and also allows Li+ to dissolve in suitable non-coordinating solvents, including non-polar solvents, where it remains "naked", in this sense non-coordinated with solvent. While lithium salts are generally readily soluble in polar (coordinating) solvents, but in those type of coordinating solvents $Li^+$ is no longer "naked," but is stabilized by solvation, and hence its catalytic activity decreases.

The anion constituents of the lithium salts used in the invention should not be so nucleophilic that they deactivate the lithium cation to make it inactive. Useful lithium salts are those lithium salts having non-nucleophilic anions. Some useful non-nucleophilic anions are listed in Strauss, S. H., Chem. Rev. 93:927-942, 1993; Reed, C. A., Acc. Chem. Res. 31:133-139, 1998; Krossing, 1. et al., Angew. Chem. Int. Ed. 43:2066-2090, 2004. One group of lithium salts are those containing boron-containing non-nucleophilic anions. One group of lithium salts are those containing carborane anions. Some useful carborane and borane anions include those described in U.S. Pat. No. 5,731,470 and in PCT publication WO02/079210, and include the group $(CB_qR_{m'})^-$, where R is a hydrogen or an alkyl group having from 1 to 10 carbon atoms and where q is an integer from 5 to 11 and m' is an integer from 5-16. Borane and carborane anions of U.S. Pat. No. 5,731,470 also include closo-borate anions of the formula $B_nH_{(n-x)}R_x^{2-}$, wherein n is an integer from 6 to 14 and x is an integer from 2 to n, and wherein each R, independent of each other R, is a hydrocarbon substituent or halogenated-hydrocarbon substituent or a halogen and closo-carborate anions of the formula $CB_pH_{(p+1)-y}R_y^{1-}$, wherein p is an integer from 5 to 13 and y is an integer from 2 to p+1, and wherein each R, independent of each other R, is a hydrocarbon substituent or a halogenated-hydrocarbon substituent or a halogen. US patent No. 5,731,470 also describes hemiclosoboranyl radical anions of the formula $B_rH_{(r-z)}.R_z^{\cdot 1-}$, wherein r is an integer from 6 to 14 and z is an integer from 2 to r and wherein each R, independent of each other R, is a hydrocarbon substituent or halogenated-hydrocarbon substituent or a halogen. "Hydrocarbon substituent" as used herein, means any linear alkyl, branched alkyl, linear alkenyl, branched alkenyl, linear alkynyl, or branched alkynyl, wherein there can be any combination of one or more double bonds or triple bonds. "Halogenated-hydrocarbon substituent" as used herein means any halogenated-linear alkyl, halogenated-branched alkyl, halogenated-linear alkenyl, halogenated-branched alkenyl, halogenated-linear alkynyl, or halogenated-branched alkynyl, wherein there can be any combination of one or more double bonds or triple bonds. Halogenated hydrocarbon substituents specifically include perhalogenated hydrocarbons, particularly perfluorinated hydrocarbons. The hydrocarbon substituents of these anions and radicals include linear or branched alkyl, alkenyl or alkynyl groups and halogenated-hydrocarbon groups. Anions and radicals also include those in which any one of the hydrocarbon or halogenated-hydrocarbon substituents are derivatized to contain a variety of functional groups. These substituents can be derivatized with any of the following functionalities: amine, cyano, hydroxyl, thiol, carbonyl, carboxylate or carboxylic acid, halogen, epoxide, ester, amide, and ether. Substituents may be longer chain species containing more than about 7 carbon atoms or shorter chain species containing one to about 6 carbon atoms. Compounds include among others, those compounds in which the substituents have from one to about 20 carbon atoms and those which have from one to about 6 carbon atoms. Hydrocarbon substituents can be selected from methyl, ethyl, n-propyl, n-butyl, n-pentyl, n-hexyl, iso-propyl, sec-butyl, t-butyl, ethenyl, propenyl, butenyl, pentenyl, hexenyl, acetyleny, propynyl, butynyl, pentynyl or hexynyl groups. Representative alkyl groups also include among others n-heptyl, n-octyl, n-nonyl, n-decyl, n-undecyl, and n- dodecyl groups. More preferred hydrocarbon substituents include methyl, ethyl and n- propyl. Methyl is the most preferred hydrocarbon substituent. Halogenated-hydrocarbon substituents include, among others, those which have from one to about 20 carbon atoms, including longer chain species with 7 or more carbon atoms and shorter chain species which have from one to about 6carbon atoms. Halogenated-hydrocarbon substituents can have any degree of halogenation, i.e. the substituent may have one or more halogens. Specifically, the substituent can be perhalogenated. Halogenated-hydrocarbon substituents can be selected from trihalomethyl groups, particularly trifluoromethyl and partially halogenated species such as 2,2,2-trihaloethyl groups, particularly 2,2,2-trifluoroethyl. Trifluoromethyl is the most preferred halogenated-hydrocarbon substituent. Particular examples of carborane anions include $RC(BR)_{11}^-$; and $RC(BR)_9^-$; where R is a hydrogen or an alkyl group, and the R's may be the same or different. Preferred R's are alkyl groups having 1-10 carbon atoms including methyl, ethyl and propyl. R in borane and carborane anions useful in this invention further include halides (F, Cl, Br and I) and halogenated (including chlorinated and fluorinated) alkyl groups, including trihalomethyl groups, particularly trifluoromethyl groups. Lithium borane salt catalyst useful in the polymerization method of this invention include $B_{12}R_{12}^{2-}$ and $B_{10}R_{10}^{2-}$, where R is selected from a hydrogen or an alkyl group having from 1 to 10 carbon atoms, and the R's are the same or different.

U.S. Pat. Nos. 6,130,357 and 6,180,829 report certain weakly coordinating monoheteroborane anions which can be used as anions for the Li+ cation catalysts in the methods herein with the proviso that the resulting Li+ salt exhibits sufficient solubility in a non-coordinating solvent or in neat monomer (e.g., benzene, 1, 2-dichloroethane, cyclohexane, alkene etc.) to exhibit catalyst activity under those conditions.

BARF (tetrakis(3,5-bis(trifluoromethyl)phenyl)borate) and BARF (tetrakis(pentafluorophenyl)borate) can be used as anions in the lithium salts of the invention, although they are not preferred. One group of useful lithium salts do not contain a transition metal.

Choice of a given anion for use in catalysts herein also should take into account that the resultant Li+ salt should exhibit adequate solubility in a relatively non-coordinating solvent, at a temperature that compatible with the desired polymerization reaction, in which the Li+ ion can remain sufficiently uncoordinated to retain activity as a polymerization catalyst in the methods herein. Solubility of a given Li+ salt in a given non-coordinating solvent can be readily assessed at ambient (room temperature) or at a temperature above or below ambient that is compatible for the polymerization reaction.

Li+ salt catalysts of this invention are catalysts that can activate even those alkenes toward radical polymerization that do not carry an activating substituent in the molecule.

The term "lithium salt" is intended to indicate a lithium cation is associated with an anion, not that a particular crystal structure is formed.

As used herein, a "lithium carborane catalyst" is a molecule containing both a lithium cation and a carborane anion. Although the word "catalyst" is used, applicant is not intending to limit the function of the lithium carborane catalyst to classical catalytic reaction mechanisms. Any function of the lithium carborane catalyst, whether catalytic or not, is intended to be included. Examples of lithium carborane catalysts include those having the carborane anion: $(CB_qR_{m'})^-$, where R is a hydrogen or a small alkyl group having from 1 to 10 carbon atoms, and the R's may be the same or different, where q is an integer from 5 to 11 and m' is an integer from 5-16. One group of small alkyl groups have from 1 to 6 carbon atoms. Other examples of carborane anions that can be present in the lithium carborane catalyst include: —$C(BR)_9^-$, or $RC(BR)_{12}^-$; where R is a hydrogen or a small alkyl group having from 1 to 10 carbon atoms, and the R's may be the same or different. Specific examples of carborane anion that can be present in the lithium carborane catalyst are those selected from the group consisting of: $CB_{11}Me_{12}^-$; $HCB_{11}Et_9Me_{12}^-$; $CB_{11}HxEt_9Me_2^-$; $HCB_{11}Me_{11}^-$; $CB_{11}H_6I_6^-$; and $CB_{11}H_{12}^-$. The carborane anion, which normally is a closed-shell species (for example alkylated carborane anions), also could be a radical anion (for example, alkylated boron anions), with an open shell.

As used herein, "polymer precursors" are molecules containing at least one carbon-carbon multiple bond (such as a double bond or triple bond). One group of polymer precursors are those molecules having at least one terminal double bond. One group of polymer precursors are those alkenes that contain at least one terminal double bond and do not contain an activating group near the double bond. Some examples of polymer precursors are ethylene, propylene, 1-butene, 1-pentene, 1-hexene, 1-heptene, and others containing straight or branched alkyl chains with from 1 to 40 carbon atoms and a terminal double bond. One group of polymer precursors are straight chain alkenes with a terminal double bond and between 1-40 carbon atoms ("simple alkenes"). One group of polymer precursors are straight chain alkynes with a terminal triple bond, such as acetylenes, for example 1-hexyne. Some particular examples of polymer precursors are: $CH_2=CH_2$; $MeCH=CH_2$; $Me_2C=CH_2$; $EtCH=CH_2$; $PrCH=CH_2$ n-$BuCH=CH_2$; $Me_3SiCH=CH_2$. One class of polymer precursors are those with formula: $CH_2=CR—(CR_2)_n—CR_3$, where n is an integer and the R's are the same or different and are selected from the group consisting of: H; alkyl, and halogen, including F, Cl, Br. Other examples of polymer precursors include branched alkyl groups having a terminal double bond such as isobutylene and isoprene, and ring-containing structures having a terminal double bond such as styrene. One class of polymer precursors are dienes.

The Li+ catalysts of this invention function for polymerization of unactivated alkenes in addition to activated alkenes. The terms activated and unactivated refer to activation for (alkyl) radical addition, i.e. for the propagation step of alkene radical polymerization. An alkyl substituent, for example, on an alkene does not provide such activation. Substituents such as —COOR, —OCOR, -C6H5, -CN, among many others do function for such activation.

As used herein, a "lithium carborane polymer precursor" is a lithium carborane that also contains a terminal alkene or alkyne in the same molecule. Some examples of lithium carborane polymer precursors include compounds [n]2:

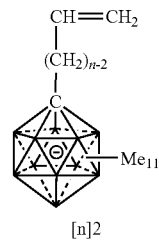

[n]2 where n is an integer greater than 2. In one group of lithium carborane polymer precursors, n=2-7. In one group of lithium carborane polymer precursors, n is less than 12. In one group of lithium carborane polymer precursors, n is an integer up to and including 30. One example of lithium carborane polymer precursor is $CH=CH_2—(CH_2)_{n2}C(B_qR_{m'})^-Li^+$, where R is a hydrogen or an alkyl group having from 1 to 10 carbon atoms, the R's may be the same or different; n is an integer greater than 2; q is an integer from 5 to 11; and m' is an integer from 5-16. In one embodiment, n is 5-7.

As used herein, "reaction solvent" is a solvent or mixture of solvents which dissolves the lithium salt to an appreciable extent without appreciably complexing with the lithium salt and without appreciably deactivating the lithium salt. It is the Li+ that is believed to be the catalyst in the polymerizations herein. Anions and solvent conditions which enhance the availability of the cation and decrease its complexation are preferred. It is believed the solubility of the lithium salt in the reaction medium is important in successful catalysis. As will be appreciated by the discussion herein, the reaction solvent should not be a reactant in the reaction. For example, the reaction solvent should not bind to the lithium cation so that it solvates to compete with the alkene. It is preferred that the reaction solvent not react to a great extent with radicals because that would reduce the efficiency of the polymerization reaction. Coordinating solvents such as THF complex and deactivate the Li⁺ and are not preferred solvents. In generally, coordinating solvents include ethers, alcohols, amines, and acids among others. Non-coordinating solvents include those that are non-polar. In general, more polar solvents are less preferred. And more non-polar solvent are generally preferred (so long as there is sufficient anion and monomer solubility).

The polymerization reactions of this invention can be conducted in a supercritical fluid or solvent, such as $CO_2$ or alkenes (e.g., alkenes having 1-4 carbon atoms and terminal alkenes that are to be polymerized). A supercritical fluid (SCF) is defined as a substance above its critical temperature ($T_C$) and critical pressure ($P_C$). The critical point represents the highest temperature and pressure at which the substance can exist as a vapour and liquid in equilibrium. A solvent that is under supercritical conditions can exhibit different solubilization properties compared to the solvent under non-supercritical conditions.

Radical inhibitors such as hydroquinone are also not desired because they scavenge radicals. Suitable reaction solvents include 1,2-dichloroethane; aromatic or aliphatic hydrocarbons and aromatic or aliphatic hydrocarbons substituted with one or more alkyl groups, haloalkyl groups or halogens, more specifically with one to six alkyl groups or halogens, including chlorine and fluorine; such as benzene and toluene; and alkanes and cycloalkanes (such as hexane or cyclohexane), halogentated alkanes and cycloalkanes, sulfones and mixtures thereof. A reaction solvent with a polarizable π-system provides very weak stabilization of the Li⁺ salt, which is desirable for solubility. One example of a suitable reaction solvent is silicone oil. Solvents containing oxygen in the molecule are a class of solvents that are not generally useful.

As used herein, "initiators" are those substances which act spontaneously or can be activated with light or heat to initiate polymerization of the polymer precursor. Examples of initiators include air, oxygen, AIBN (azo-bisisobutyronitrile) and other azo compounds, peroxides such as benzoyl peroxide or di-t-butyl peroxide, NO and $NO_2$. Some initiators are activated by the Li⁺ and do not require the application of heat or light. Some initiators are activated by irradiation with light. Light used in the invention includes any wavelength and power capable of initiating polymerization. Preferred wavelengths of light include ultraviolet or visible. Any suitable source may be used, including laser sources. The source may be broadband or narrowband, or a combination. The light source may provide continuous or pulsed light during the process.

"Polymerizing conditions" are the temperature, pressure and the presence of an initiator that result in a detectable amount of polymer formation. Useful temperatures for polymerization are easily determined by one of ordinary skill in the art without undue experimentation in further view of the description herein. Ambient temperature may be used. In industrial use, a temperature of between about 50 and 100° C. is particularly useful since reaction heat can be removed easily. The catalysts described herein work under these temperatures, if an initiator is chosen that decomposes at a useful rate at that temperature, as it is believed the catalyst promotes the decomposition of the initiator. One example of polymerizing conditions is a temperature below the temperature at which the initiator ordinarily decomposes. For example, it is known that AIBN generally generates radicals at about 60° C. In the current invention, AIBN can be used below room temperature, at room temperature and above room temperature. Di-t-butyl peroxide generally generates radicals above about 100° C. In the current invention, di-t-butyl peroxide can be used at temperatures of about 80° C. Useful pressures for polymerization are readily determined by one of ordinary skill in the art without undue experimentation in further view of descriptions herein. Ambient atmospheric pressure may be used. It is known that polymerizing conditions can vary depending on the desired product. Any combination of pressure and temperature which produce a detectable amount of polymer can be used in the methods described here. For example, in general, as the temperature decreases, the average molecular weight of the polymer produced changes.

As used in herein, "low molecular weight producing polymerization conditions" are those polymerization conditions such as catalyst, solvent and temperature that produce low molecular weight polymers. For purposes of this invention low molecular weight polymers are those that exhibit weight average molecular weight less than 10,000. Such conditions are known in the art. As used in herein, "high molecular weight producing polymerization conditions" are those polymerization conditions such as catalyst, solvent and temperature that produce high molecular weight polymers. For purposes of this invention low molecular weight polymers are those that exhibit weight average molecular weight greater than 10,000. Such conditions are known in the art.

The following description provides nonlimiting examples of some of exemplary embodiments of the invention and is intended to further illustrate the invention. Applicant does not wish to be bound by any theory presented here.

Li⁺-Catalyzed Radical Polymerization of Simple Terminal Alkenes

Vyakaranam, K; Barbour, J. B. and Michl, J. Li⁺-Catalyzed Radical Polymerization of Simple Terminal Alkenes," *J. Am. Chem. Soc.* 2006; 128(17); 5610-5611 and the supporting information concerning this publication available from the American Chemical Society provide details of this invention. This article and the supporting information submitted to the American Chemical Society related to this publication are incorporated by reference herein in their entirety to provide additional experimental details for making catalysts, for carrying out polymerization reactions and for characterizing polymers.

Uncatalyzed radical polymerization of unsubstituted alkenes is only effective for ethylene at high pressure and temperature, only produces low molecular weight oligomers of other alkenes, and has been eclipsed by transition-metal catalyzed (or cationic polymerization (Cheradame 1984; Sangalov et al. 2001). Remarkably, in weakly ligating solvents under ambient conditions, Li⁺ salts of highly alkylated derivatives of the monocarbadodecaborate anion 1 induce facile polymerization of terminal alkenes by the radical mechanism.

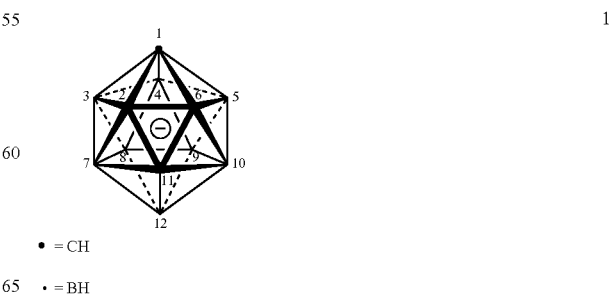

● = CH
· = BH

To promote the polymerization of simple alkenes, Li$^+$ is preferably in a poorly solvated ("naked") form. Li$^+$ cations present in solutions of LiCB$_{11}$(CH$_3$)$_{12}$ in benzene (Pospíšil et al. 1998) and 1,2-dichloroethane accelerate pericyclic rearrangements far more than those in solutions of LiClO$_4$ in ether (Braun and Sauer 1986; Grieco 1993; Saito 2000). Neat solid CH$_2$=CH(CH$_2$)$_{n-2}$C(BMe)$_{11}^-$Li$^+$ polymerizes spontaneously on the benchtop (see below). In the presence of air or another initiator, this and related salts also undergo radical polymerization in benzene unless 12-crown-4 is added. This spontaneous polymerization is not observed in THF, a coordinating solvent.

In a solution of 10% (by weight) LiCB$_{11}$(CH$_3$)$_{12}$ in 1,2-dichloroethane, unactivated alkenes polymerize in about 18 h (liquid alkenes were at 1 M concentration and gases at saturation at atmospheric pressure). Modes of initiation studied in this experiment were: (i) laboratory air at 25° C., (ii) azoisobutyronitrile (AIBN) at 25° C., (iii) di-t-butyl peroxide (DTBP) at 80° C. Seven of the eight terminal alkenes that were examined, both 1,3-dienes, and both terminal acetylenes yielded polymers (Table 1). 3,3,3-Trifluoropropene did not react, nor did tetramethylethylene or the Z and E isomers of 2-butene.

Alkene polymers were characterized by SEC against polystyrene standards and by comparison with published $^1$H NMR and $^{13}$C NMR spectra (Brandolini and Hills 2000; Asakura et al. 1991). The dienes yielded the cis 1,4-polymers (NMR (Brandolini and Hills 2000; Asakura et al. 1991; Chen 1962; Grossman et al. 1981; Tanaka 1989) and m.p. (Yen 1959; Ricci et al. 2003)). In the air-initiated polymerizations of alkenes and alkadienes, one of the terminal groups was —CH$_2$OH, quantitated as the trichloroacetyl isocyanate adduct (Goodlett 1965), permitting an independent determination of the degree of polymerization. The polyacetylenes contained both cis and trans double bonds ($^1$H NMR, Simionescu et al. 1977; Katz and Lee 1980) and had the expected UV-vis spectra (Cataldo 1996; Petit et al. 1999, not shown).

The high polydispersity of the polymers, the need for a radical initiator, the nature of the end group in air-initiated polymers, and the $^1$H NMR spectra, which suggest atactic structures, are all compatible with radical mechanism. An "atactic" polymer has no regularity from chiral center to chiral center and polymers that are formed by free-radical mechanisms are usually "atactic". One end group originates from the radical source.

To test the need for naked Li$^+$ and to exclude the distant possibility of Li$^+$-induced cationic polymerization, additional controls were run with 1-hexene. Air did not initiate its polymerization when 12-crown-4 was added, when Li$^+$ was replaced with Na$^+$ or Cs$^+$, or when 1,2-dichloroethane was replaced with THF (a coordinating solvent). Deaerated 1-hexene did not polymerize (i) with LiCB$_{11}$(CH$_3$)$_{12}$ without initiator or with DTBP at 25° C. without irradiation, (ii) with AIBN at 25 or 65° C. without LiCB$_{11}$(CH$_3$)$_{12}$, and (iii) in the presence of 0.1 M hydroquinone with AIBN in 1,2-dichloroethane at 25 or 50° C. 1-Hexene took longer (26 h) to polymerize in the presence of 0.1 M t-BuOLi which presumably ties up Li$^+$ partially as t-BuOLi$_2^+$ than with LiCB$_{11}$(CH$_3$)$_{12}$. CHD($\delta$ 0.85 ppm in $^2$D NMR) was incorporated into the polymer in the presence of 1% CD$_3$OD, but not CH$_3$OD.

At the temperatures used, AIBN and DTBP do not ordinarily yield radicals at a useful rate in the dark. However, like other Lewis acids, LiCB$_{11}$Me$_{12}$ catalyzes the thermal decomposition of both initiators. The decay of AIBN in benzene-d$_6$ at 25° C. has been found by us to be first order in AIBN and in LiCB$_{11}$Me$_{12}$, with an observed rate constant of k$_{obs}$=0.49 [LiCB$_{11}$Me$_{12}$]/L mol$^{-1}$ s$^{-1}$. The rate of decomposition of DTBP (initial concentration, 0.015 M) in 1,2-dichloroethane-d$_4$ at 80° C. is first order in DTBP and in LiCB$_{11}$Me$_{12}$, with k$_{obs}$=0.63[LiCB$_{11}$Me$_{12}$]/L mol$^{-1}$ s$^{-1}$.

1-Hexene and trimethylvinylsilane copolymerize with vinyl acetate (ViAc) and methyl methacrylate (Meth), (see Table 2).

TABLE 1

LiCB$_{11}$(CH$_3$)$_{12}$ Catalyzed Polymerization in 1,2-Dichloroethane[a]

| | Aerobic 25° C. | | | | | AIBN 25° C. | | | | DTBP 80° C. | | | | DTBP/UV 25° C. | | | |
|---|---|---|---|---|---|---|---|---|---|---|---|---|---|---|---|---|---|
| monomer | M$_w$/10$^3$ | M$_n$/10$^3$ | n[b] | n[c] | Y (%) | M$_w$/10$^3$ | M$_n$/10$^3$ | n[b] | Y (%) | M$_w$/10$^3$ | M$_n$/10$^3$ | n[b] | Y (%) | M$_w$/10$^3$ | M$_n$/10$^3$ | n[b] | Y (%) |
| CH$_2$=CH$_2$ | 3.00 | 1.15 | 41 | 40 | 75 | 3.40 | 1.20 | 43 | 82 | 6.20 | 2.00 | 71 | 88 | 1.40 | 0.53 | 19 | 88 |
| MeCH=CH$_2$ | 8.85 | 3.45 | 82 | 80 | 83 | 9.15 | 3.60 | 90 | 88 | 20.4 | 7.15 | 170 | 92 | 4.45 | 2.30 | 55 | 93 |
| Me$_2$C=CH$_2$ | 4.90 | 1.70 | 30 | 27 | 70 | 5.25 | 2.10 | 37 | 78 | 7.75 | 2.70 | 47 | 90 | 2.75 | 1.70 | 30 | 95 |
| EtCH=CH$_2$ | 6.60 | 2.35 | 42 | 41 | 80 | 9.60 | 3.10 | 55 | 84 | 33.5 | 11.9 | 212 | 92 | 3.25 | 1.90 | 34 | 98 |
| t-BuCH=CH$_2$[d] | 3.50 | 1.25 | 15 | 13 | 68 | 9.05 | 2.60 | 31 | 79 | 12.2 | 3.40 | 40 | 85 | 2.28 | 1.49 | 18 | 85 |
| n-BuCH=CH$_2$ | 2.50 | 1.15 | 14 | 14 | 65 | 10.3 | 4.90 | 53 | 75 | 23.8 | 9.50 | 110 | 85 | 8.10 | 2.90 | 35 | 94 |
| Me$_3$SiCH=CH$_2$ | 9.80 | 4.00 | 38 | 35 | 75 | 24.1 | 10.5 | 100 | 78 | 35.2 | 11.4 | 109 | 86 | 10.8 | 4.25 | 43 | 98 |
| CH$_2$=CMeCH=CH$_2$ | 8.00 | 3.50 | 51 | 50 | 82 | 13.2 | 4.90 | 72 | 86 | 18.5 | 6.40 | 94 | 90 | 12.4 | 4.59 | 68 | 99 |
| CH$_2$=CMeCMe=CH$_2$ | 10.2 | 4.40 | 53 | 50 | 75 | 18.5 | 6.10 | 74 | 85 | 22.2 | 7.20 | 87 | 89 | 9.55 | 3.98 | 48 | 99 |
| C$_6$H$_5$—C≡CH[e] | 9.00 | 2.70 | 26 | | 82 | 14.0 | 6.00 | 76 | 85 | 28.9 | 9.05 | 88 | 94 | 13.5 | 5.25 | 51 | 90 |
| n-Bu-C≡CH[f] | 12.4 | 4.10 | 48 | | 88 | 16.2 | 5.50 | 67 | 90 | 24.0 | 7.05 | 85 | 95 | 15.9 | 5.59 | 68 | 94 |

[a]Unoptimized results with commercial alkenes. LiCB$_{11}$(CH$_3$)$_{12}$, AIBN, and DTBP at 10% by weight. Degassed samples, except for aerobic initiation, done in ambient air. The polymers were precipitated with CH$_3$OH and the catalyst recovered almost quantitatively after filtration and solvent evaporation, with no noticeable loss of activity. Without catalyst, no polymer was formed.
[b]Average degree of polymerization (SEC in THF with polystyrene standards).
[c]From $^1$H NMR spectra; quantitated after treatment of the polymers with trichloroacetyl isocyanate. The —CH$_2$O—CO—NHCO—CCl$_3$ protons were a doublet at 3.77-4.03 ppm (J = 6.1-6.3 Hz) and the —NH protons a broad singlet at 10.42-10.47 ppm. Protons of —CRHO—CO—NH—CO—CCl$_3$ groups, expected at 5.15-5.22 ppm, were not detectable. Peaks in the vinylic region were extremely weak or absent.
[d]This polymer contains no CH$_2$ groups and its structure is under investigation.
[e]UV-Vis (dichloromethane): $\lambda_{max}$ = 248 nm ($\epsilon$ = 6100 M$^{-1}$ cm$^{-1}$), 328 nm ($\epsilon$ = 3100 M$^{-1}$ cm$^{-1}$), 380 nm ($\epsilon$ = 2900 M$^{-1}$ cm$^{-1}$).
[f]UV-Vis (hexane) $\lambda_{max}$ = 285 nm ($\epsilon$ = 1900 M$^{-1}$ cm$^{-1}$), 330 nm ($\epsilon$ = 1700 M$^{-1}$ cm$^{-1}$). The absorption coefficients are per monomer.

TABLE 2

| LiCB₁₁(CH₃)₁₂ Catalyzed Copolymerization[a] | | | | | |
|---|---|---|---|---|---|
| monomers[b] | $M_w$ | $M_n$ | ratio[c] | n[d] | Y % |
| n-BuCH=CH₂/ViAc | 5100 | 2100 | 30/70 | 7/17 | 88 |
| n-BuCH=CH₂/Meth | 8150 | 2500 | 27/73 | 8/18 | 90 |
| Me₃SiCH=CH₂/ViAc | 6800 | 3000 | 37/63 | 11/22 | 85 |
| Me₃SiCH=CH₂/Meth | 8500 | 2700 | 40/60 | 10/16 | 92 |

[a] With AIBN, 25° C. SEC, relative to polystyrene.
[b] Equimolar ratio of monomers.
[c] By mass, quantified by ¹H NMR.
[d] Degree of polymerization for each component.

In the four copolymerizations shown in Table 2, no homopolymers are formed. This is however not always the case, and when isobutylene is copolymerized with the same polar co-monomers, ViAc and Meth, both homopolymers are produced in addition to the copolymer.

To compare the effectiveness of Li⁺ salts of various anions in promoting the propagation step at a constant initiation rate, samples containing degassed 1-hexene, 10% DTBP, and a 10% Li⁺ salt (both by weight) in 1,2-dichloroethane were exposed to the same UV photon flux (450 W medium-pressure Hg lamp with a Pyrex filter) in a merry-go-round apparatus at 25° C., where this initiator is inactive in the dark. The $M_w$ (n, polydispersity) obtained with Li(1-Hx-CB₁₁Et₉Me₂), Li(1-H—CB₁₁Et₉Me₂), LiCB₁₁Me₁₂, Li(1-H—CB₁₁Me₁₁), Li[(7-12)-I₆—CB₁₁H₆], LiCB₁₁H₁₂, and LiB(C₆F₅)₄⁻ (which is essentially the same as no catalyst at all), were 13 500 (55, 2.9), 11 200 (46, 2.9), 9500 (41, 2.8), 8600 (36, 2.8), 6700 (26, 3.1), 5600 (23, 2.9) and no polymer, respectively (SEC, polystyrene standards). These results are shown in FIG. 1. Thus, Li⁺ catalyzes both initiation and propagation, the latter presumably by complexing the alkene as suggested by calculations.

Characterization of Polymers

Size Exclusion Chromatography (SEC): Molecular weights and polydispersities of the polymers were determined in THF solutions by SEC at ambient temperature and calibrated against Aldrich polystyrene standards. A Waters Gel Permeation Chromatograph, differential refractometer, refractive index detector (RI 2414) and EMPOWER software were used, with a three-column bed (Styragel HR 4.6×300 mm columns with 5 μm bead size, for molecular weight ranges 100-5 000, 500-30 000, and 5000-600 000) and a flow rate of 0.3 mL/min. The results were the same for the crude polymers and those precipitated from methanol.

Radical Polymerization of Lithium Salts of, CH₂=CH (CH₂)ₙ₋₂C(BMe)₁₁⁻Li⁺

It was discovered that solid samples of the lithium salt of the alkenylcarborate anion, CH₂=CH(CH₂)ₙ₋₂C(BMe)₁₁⁻Li⁺ ([n]2, n=5, 6, 7), spontaneously polymerized in less than a day of storage under ambient conditions, whereas the cesium salt was perfectly stable. An efficient synthesis of the lithium salts [n]2, (n>2) is described; the products of their room-temperature "spontaneous" (actually, oxygen-induced) polymerization are characterized, and evidence is provided that this polymerization proceeds by a radical and not an ionic mechanism.

An Improved Synthesis of the Terminal Alkenes [n]2, (n>2). The original synthesis of the salts [n]2 (n=2-7) (Vyakaranan et al. 2004) relied on the known deprotonation (Jelinek et al. 1993) and alkylation of the weakly acidic CH vertex in the anion (see scheme 1). The alkenyl chain was introduced in a masked form (i.e., protected), since the conditions of a subsequent permethylation of the carborane cage with methyl triflate (King et al. 1996 and U.S. Pat. No. 5,731,470) are not compatible with the presence of a multiple bond, an aromatic ring, or a lone pair elsewhere in the molecule. Finally, the double bond was unmasked (deprotected).

Scheme 1: a. C₆H₅CH₂NMe₂, methanol, reflux, 3-5 d. b. MeOTf, CaH₂, sulfolane. c. MeLi, -10° C., ether.

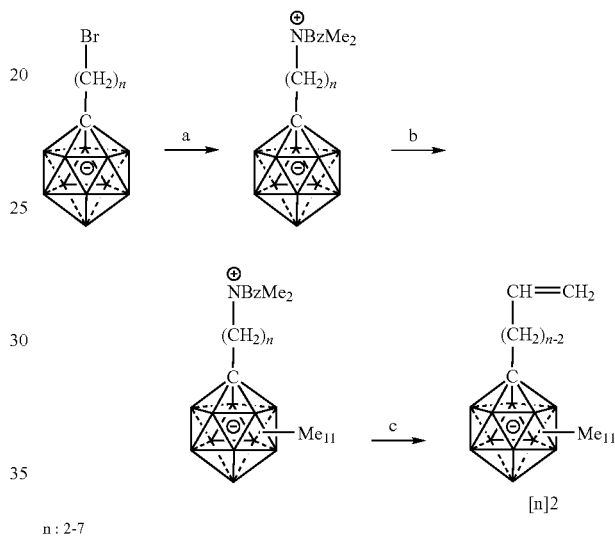

n : 2-7

Reaction conditions have been discovered that permit the undecamethylation of the 1-halo derivatives of 1 and make 4 and 5 readily available. This has changed the synthesis strategy radically. The following reaction scheme represents the route of choice for the preparation of [n]2, n>2 (for n=2, the procedure in Scheme 1 was used).

Under scrupulously dry conditions, the halogen-lithium exchange in 4 or 5 with n-BuLi or t-BuLi in THF, toluene or DME (1,2-dimethoxyethane) is quantitative. The lithiated anion is an extremely strong base and deprotonates THF after a few hours at room temperature. Subsequent reactions with the bromoalkenes CH₂=CH—(CH₂)ₙ₋₂—Br required 15-72 h and gave the desired products in 58-77% yields. The byproduct was 3, suggesting possible interference by electron transfer from the lithiated 3 to the C—Br bond. Such transfer would produce the radical anion C(BMe)₁₁⁻, expected to abstract a hydrogen atom from the solvent or the alkyl radical to yield 3. Allylation (n=3) was examined in more detail and the results were compatible with the suspicion. Allyl iodide gave no [3]2, and produced 3 quantitatively. Allyl bromide and allyl chloride reacted much more slowly, but gave 69% and 52% of [3]2, respectively. To avoid the interference, the tosylates CH₂=CH—(CH₂)ₙ₋₂—OTos were used, and it was found that the products [n]2, n>2, were produced in almost quantitative yields in 10-15 h.

Scheme 2: a. n-BuLi, -78° C. b. TosO—(CH$_2$)$_{n-2}$—CH=CH$_2$, 10-15 h

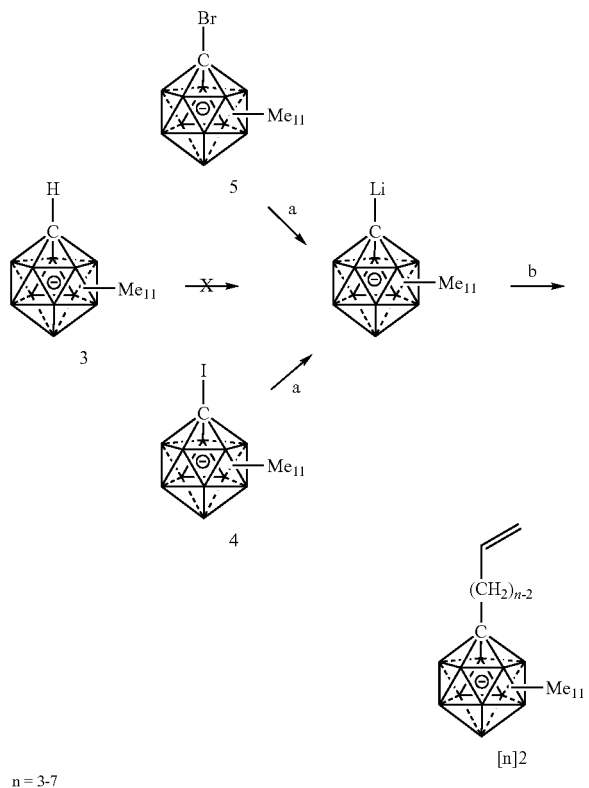

n = 3-7

In an alternative synthesis of [n]2, n>2, the halogen-lithium exchange in 4 or 5 is followed by alkylation with a dibromoalkane, Br—(CH$_2$)$_n$—Br, to afford the ω-bromoalkyl derivative [n]7 in 65-85% yields, followed by dehydrobromination with LiTMP in 87-98% yields. This reagent overcomes the difficulties experienced previously with the dehydrohalogenation of C(BMe)$_{11}^-$ carrying primary alkyl bromides under more usual reaction conditions.

Scheme 3: a. n-BuLi, -78° C. b. Br—(CH$_2$)$_n$—Br, 6-18 h. c. LiTMP.

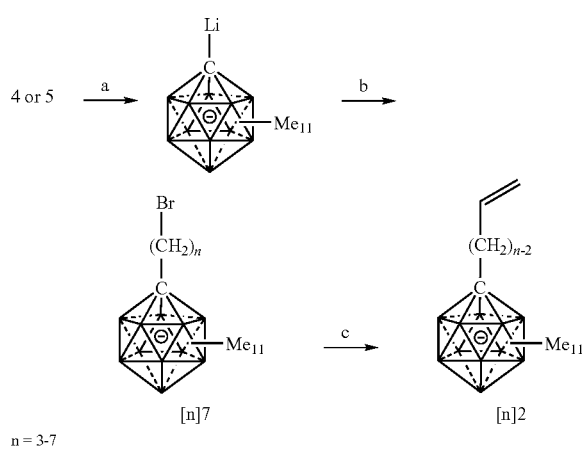

n = 3-7

Oligomers Formed from Solid Li$^+$ salts of [n]2 Spontaneously upon Standing. It was observed that after several weeks of storage in closed or open vials at room temperature, without any effort at protection from air or ambient moisture, the solid microcrystalline lithium salts [n]2, n=5, 6, or 7, partially lost their solubility in non-polar solvents such as toluene. GPC examination of [5]2 and [6]2 revealed the presence of oligomers consisting of up to ten monomer units.

This curious phenomenon has been examined in more detail and it was found that the spontaneous oligomerization of [n]2, n=5, 6 or 7, under ambient conditions is complete in a single day (Table 3). Under the same conditions the lithium salts with shorter alkenyl chains, n=2-4, are stable indefinitely, as are the sodium or cesium salts with chains of any length. A mixture of 10% of the lithium and 90% of the cesium salt of [5]2 oligomerizes entirely. The NMR spectra of the purified oligomers are those expected for polyalkenes and show no evidence for the presence of double bonds even at the highest magnification. They show that one chain end is terminated with —CH$_2$OH groups, and —CHROH groups are not detectable.

Spontaneous Polymerization of Li$^+$ Salts of [n]2 in Solution. The lithium salts of [5]2, [6]2, and [7]2, but not their sodium or cesium salts, also polymerize in about 1 day when kept at room temperature in air in a saturated solution in benzene (Table 3). According to NMR analysis, one chain end is again terminated with —CH$_2$OH groups, and —CHROH groups are absent. The reaction of the lithium salt of [5]2 was also attempted in 1,2-dichloroethane, where it proceeds smoothly, and tetrahydrofuran, where it does not take place even after two days. When the Li$^+$ sequestering agent, 12-crown-4, is also present in the 1,2-dichloroethane solution of the lithium salt of [5]2, no reaction is observed after four days. When hydroquinone or TEMPO are present in the 1,2 dichloroethane solution of the lithium salt of [5]2, no polymer is formed even at elevated temperatures. When a fresh benzene solution of the lithium salt of [5]2 is deoxygenated and left at room temperature, no polymer is formed even after three days at room temperature followed by two days of reflux.

Initiator-Induced Polymerization of Li$^+$ Salts of [n]2 in Deaerated Solution. In the absence of air, pure benzene solutions of the lithium salts of the monomers are stable indefinitely, but when a radical initiator is present, polymerization occurs even at relatively low temperatures at which the initiator is ordinarily stable. In the presence of 10% azoisobutyronitrile (AIBN) by weight, the room-temperature polymerization of the lithium salts of [5]2, [6]2, and [7]2 in benzene is complete in 8 hours (Table 3). The —CMe$_2$CN terminal group was detected by $^{13}$C NMR. With 1% AIBN, the reaction of [5]2 is far slower but takes place at 60° C. Copolymerization of [6]2 with an equimolar amount of 1-hexene in the presence of 1% AIBN at room temperature produces a copolymer containing a 60:40 [6]2/hexene ratio by $^1$H and $^{13}$C NMR. No polymerization of the lithium salts of [2]2, [3]2, and [4]2 is observed even after long times and at elevated temperatures.

TABLE 3

Products of Room Temperature Polymerization of Li+ Salts of [n]2

| monomer | $M_w$ | $M_n$ | n (GPC)[a] | n (NMR[b])[c] | yield (%) |
|---|---|---|---|---|---|
| Solid State, Spontaneous in Air | | | | | |
| [5]2 | 5800 | 2300 | ~6 | ~5 | 83 |
| [6]2 | 8600 | 3200 | ~8 | ~8 | 91 |
| [7]2 | 10400 | 3900 | ~10 | ~9 | 87 |
| Benzene Solution, Spontaneous in Air | | | | | |
| [5]2 | 24700 | 9500 | ~25 | ~22 | 80 |
| [6]2 | 27900 | 12700 | ~32 | ~30 | 89 |
| [7]2 | 33600 | 14600 | ~36 | ~33 | 85 |
| Benzene Solution, AIBN-Initiated, Anaerobic | | | | | |
| [5]2 | 34700 | 18500 | ~48 | | 80 |
| [6]2 | 34800 | 16600 | ~42 | | 90 |
| [7]2 | 33400 | 20900 | ~51 | | 78 |
| [6]2/$C_6H_{12}$[d,e] | 29200 | 15400 | ~24/72 | | 75 |
| 1,2 Dichloroethane Solution, di-t-Butyl Peroxide/UV-Initiated, Anaerobic | | | | | |
| [5]2 | 4930 | 1700 | ~4 | | 95 |
| [6]2 | 7060 | 2550 | ~7 | | 89 |
| [7]2 | 9120 | 3200 | ~8 | | 90 |

[a]Average degree of polymerization by GPC analysis, based on polystyrene standards.
[b]The $^1$H and $^{13}$C NMR spectra (Spectra not shown) compare well with expectations based on the literature spectra of polyalkenes: $^{13}$C NMR: Asakura, T.; Demura, M.; Nishiyama, Y. Macromolecules, 1991, 24, 2334; $^1$H NMR; Brandolini, A. J.; Hills, D. D. NMR Spectra of Polymers and Polymer Additives; Marcel Dekker: New York, 2000.
[c]Average degree of polymerization from terminal group signal integration in $^1$H NMR spectra. In air-initiated polymers, hydroxyl end groups were quantitated after treatment with trichloroacetyl isocyanate: Goodlett, V. W. Anal. Chem. 1965, 37, 431. The —CHR—$CH_2O$—CO—NH—CO—$CCl_3$ protons were observed as a doublet at 3.60-4.15 ppm (J = 6.0-6.2 Hz), and the —NH— protons as a broad singlet at 10.46-10.49 ppm. Neither —CHRO—CO—NH—CO—$CCl_3$ protons, expected at 5.15-5.22 ppm, nor any vinylic protons were detectable. In AIBN initiated polymers, $^{13}$C NMR revealed the nitrile carbon of terminal —$CMe_2CN$ groups (δ 122.4-124.8 ppm, Moad, G.; Solomon, D. H.; Johns, S. R.; Willing, R. I. Macromolecules, 1984, 17, 1094, but the methyl protons were obscured.
[d]Equimolar ratio with 1-hexene.
[e]60:40 copolymer (by mass, quantified by the $^1$H NMR) [6]2:1-hexene.

In the presence of 10% (by weight) di-t-butyl peroxide in 1,2-dichloroethane, [5]2, [6]2, and [7]2 do not polymerize in the dark at room temperature, but after 12 hours at 80° C. or upon UV irradiation at room temperature, they give polymers very similar to those obtained with 10% AIBN as described above. In the irradiation experiment, only oligomers were formed, and when 12-crown-4 was added, the polymerization reaction was suppressed altogether.

Some of the experiments were repeated in the presence of trapping agents. With 1M t-BuOLi (0.1 mL) and 10% AIBN in benzene at 80° C., polymer formation from [5]2 still occurs but is slower. Complete conversion required 18 hours. With 1% $CH_3OD$ and 10% AIBN in benzene at 25° C., a polymer is formed in 8 hours, and contains no incorporated deuterium. With 1% $CD_3OD$ and 10% AIBN in benzene at 25° C., a polymer is formed in 10 hours, and contains deuterium incorporated as CHD (δ 0.82 ppm in $^2$D NMR).

The disappearance of AIBN (0.015 M) in a $C_6D_6$ solution containing varying concentrations of $LiCB_{11}Me_{12}$ followed first-order kinetics at room temperature (25° C.). The apparent rate constant k obeyed the equation k=0.49 [$LiCB_{11}Me_{12}$]/L mol$^{-1}$ s$^{-1}$. In the absence of the lithium salt, no reaction was observable even after a few days.

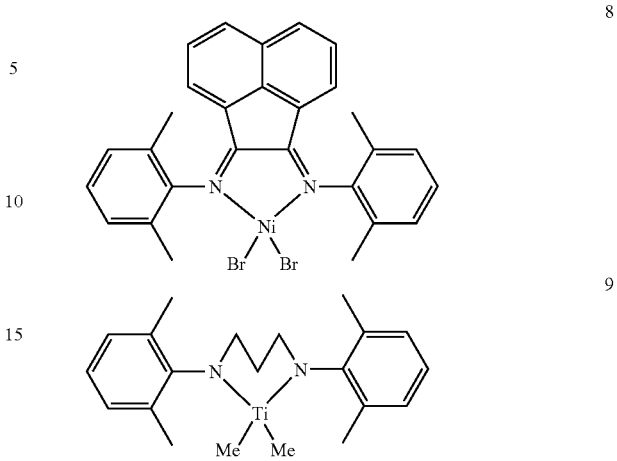

Attempted Transition-Metal-Catalyzed Polymerization of [n]2. Cationic polymerization was attempted using the recently developed non-metallocene transition metal catalysts (Gibson and Spitzmesser 2003; Johnson et al. 1995; Scollard et al. 1996) which are more active than the classical catalysts (Gibson and Spitzmesser 1995) based on group 4 metallocenes. The α-diiminenickel catalyst 8 was prepared (Johnson et al. 1995) and used with MAO as cocatalyst, and the diamide complex of titanium 9 was prepared (Scollard et al. 1996) and used with $B(C_6F_5)_3$ as cocatalyst (Scollard and McConville JACS 1996). It was verified that both catalysts polymerize 1-hexene to a high molecular weight polymer, but all attempts to polymerize [n]2, n=5 and 6, yielded only low molecular weight oligomers with $M_w$ of 1700-2600, smaller than those obtained by just allowing the solid samples of [n]2 to sit on a benchtop for a day. Extended reaction times of up to two days did not lead to increased molecular weight.

As suggested by their appearance and consistency and proven by GPC analysis and NMR spectroscopy, the products of the Li+-catalyzed reactions of [n]2 are polymeric and saturated. Although applicants do not wish to be bound by theory, it is noted that poorly solvated ("naked") Li+ cations appear to be indispensable for the polymerization to occur, regardless of the mode of initiation. When they are replaced by larger alkali metal cations or deactivated by complexation with 12-crown-4 or tetrahydrofuran, the reaction does not proceed. The deactivating effect of t-BuOLi can be attributed to its basicity, which probably allows it to tie up Li+ cations in the form of t-$BuOLi_2^+$.

The requirement for the Li+ cation to be "naked" strongly suggests that Li+ plays the role of a Lewis acid in the polymerization process. Its effects on individual steps in the polymerization mechanism are not cleanly separated in most of the observations, but both initiation (radical formation) and chain propagation are evidently catalyzed: (i) In the presence of naked Li+, AIBN decomposes at a useful rate already at 25° C. and di-t-butyl peroxide at 80° C., well below the normally required temperatures of ~60° C. and over 100° C., respectively. The linear dependence of the AIBN decomposition rate constant on Li+ concentration, observed even when Li+ is in twofold excess, suggests that a small fraction of AIBN is complexed to Li+ in a fast pre-equilibrium and that the complex slowly decomposes into Li+, $N_2$, and radicals. (ii) Upon photoinitiation at room temperature, polymerization only occurs if naked Li+ is present, and it is suppressed by the addition of 12-crown-4. This demonstrates that the propagation is catalyzed, too. The simplest mechanisms for the promotion of the radical propagation step by Li⁺ would be its complexation to the radical or to the terminal double bond.

There is considerable past analogy for catalysis by Li⁺ ions acting as a Lewis acid, for both types of processes. The decomposition of AIBN into radicals is promoted by AgClO₄, ZnCl₂, BCl₃, AlEt₃, and other Lewis acids (Barton and Borsig 1988 a). The propagation rate constant in the polymerization of acrylonitrile is increased upon the addition of LiCl (Bamford et al. 1957), and numerous similar catalytic metal salt effects have been reported for a variety of monomers strongly activated by functional groups capable of efficient complexation with Lewis acids (Barton and Borsig 1988 b). Such complexation of methacrylates and other activated double bonds has been often used to modify monomer reactivity in copolymerizations and to influence the tacticity of polymers (Renaud and Gerster 1998; Ray et al. 2003; Lutz et al. 2003; Lutz et al. 2004).

What is presented here is the discovery that even the radical polymerization of unactivated alkenes can be subject to Li⁺ catalysis, provided that the Li⁺ cations are sufficiently poorly solvated. The amazing Lewis acid activity of these cations in the solution of LiMeC(BMe)₁₁ in benzene and similar arenes is well illustrated both by the great enhancement of Lewis acid catalysis of pericyclic reactions (Moss et al. 2001) relative to the ordinarily used and in themselves quite active solution of LiClO₄ in ether (Braun and Sauer 1986; Grieco 1993; Saito 2000; Kumar 2001), which contains well solvated Li⁺ ions, and by their ability to abstract a methide anion from methylated carborane anions at elevated temperatures (Janousek et al. 2004).

Since many metal salts (but not lithium salts) and other Lewis acids are known to initiate the cationic polymerization of unactivated alkenes (Cheradame 1984), this route to the observed products needs to be considered in principle. If Li⁺ were to act like other metal cations, the first steps would be complexation with a double bond and initiation of an electrophilic attack by the activated double bond on the double bond of another alkenylcarborane anion (Scheme 4). Chain growth would be terminated by an adventitious nucleophile Nu such as water from the air or methanol, which was used as a solvent for crystallization. Either one would also convert the initially formed CLi bond to a CH bond.

Scheme 4: A hypothetical mechanism for cationic polymerization of [n]2, n = 5-7.

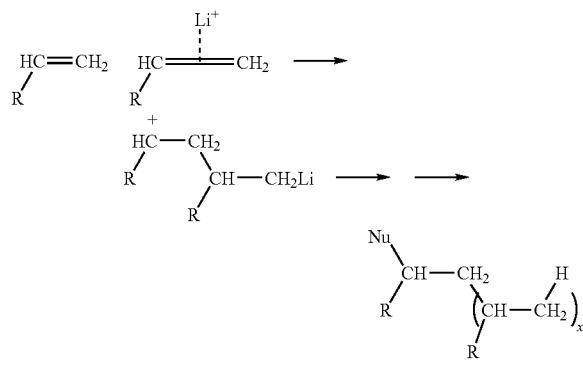

-continued

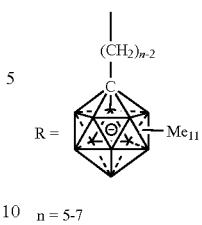

n = 5-7

The intermediacy of an alkyllithium compound, central to this mechanism, looks highly improbable, especially when it is recalled that the polymerization proceeds even in ambient atmosphere, is suppressed upon removal of air, and reactivated by addition of a radical initiator such as AIBN. It is believed that the cationic mechanism shown, and also other cationic mechanisms in which a proton would play the role presently ascribed to the lithium cation, can actually be excluded safely, because the oligomers formed in the presence of CH₃OD do not contain incorporated deuterium, while those formed in the presence of CD₃OD do.

Also the failure of active metal-based catalysts to induce significant polymerization of the terminal alkenes [n]2, while they catalyze the polymerization of simple terminal alkenes, argues against a cationic mechanism. The likely reason for this curious lack of catalytic activity is deactivation of the catalyst-alkene complex by intramolecular association of the metal center with the alkenylated carborate anion. Such association of various metal-based cations with methidic (methyl anion like) methyl groups of methylated carborate anions has been well characterized (Clarke et al. 2004; King et al. 1999; Zharov et al. 2000; Zharov et al. 2004; Ingleson et al. 2005). Based on the apparently facile abstraction of methide anions by t-butyl cations from the MeC(BMe)₁₁⁻ anion (, the chain-end carbocations involved in the mechanism under consideration would be expected not only to associate with the —C(BMe)₁₁⁻ anion, but to actually abstract a methyl group from it. They thus do not appear to be viable chain propagation intermediates in the observed polymerization of [n]2.

If the polymerization proceeds by a radical mechanism, the Li⁺ cation acts both by facilitating the generation of radicals from the initiator and by facilitating a radical attack on the double bond to produce a secondary alkyl radical. Chain growth presumably terminates by chain transfer due to allylic hydrogen abstraction.

The two simple ways in which Li⁺ could promote the radical propagation step are complexation with the radical and complexation with the alkene. Two decades ago, ab initio calculations (Clark 1986) predicted that the activation barrier for the addition of the methyl radical to ethylene will be reduced to less than half when the latter is complexed to Li⁺, and reported no indication that the Li⁺ cation might prefer to move from the alkene to the radical. More recent calculations (Horn and Clark 2003) predicted that the activation of a double bond by such complexation is general and not restricted to ethylene. It is perhaps not surprising that there has been no experimental verification of these computational results as far as we are aware, since soluble salts that would serve as sources of "naked" Li⁺ cations capable of complexing an isolated double bond in very weakly coordinating solvents have not been available, and the anions [n]2 are highly unusual in this regard. If we take the computational results at face value, the mechanism shown in Scheme 5 is given.

Scheme 5: The proposed mechanism for radical polymerization of [n]2, n = 5-7. The chain-terminating hydrogen abstraction is not shown explicitly.

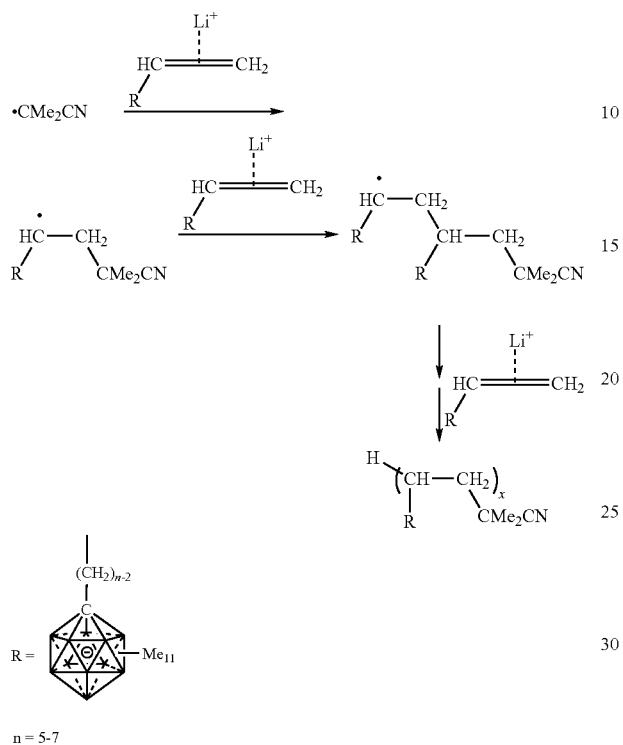

n = 5-7

The mechanism for the lithium cation catalyzed radical polymerization of simple unactivate alkenes, in which the carborane anion substituent R is missing is proposed to be the same as that described herein.

Although this behavior is also unprecedented for the polymerization of a terminal alkene without an activating substituent, it looks more plausible a priori, and all the evidence described above is compatible with it. Oxygen is apparently able to act as an initiator, and is responsible for the presence of a terminal hydroxy group. Its removal suppresses the reaction, as does the addition of a radical scavenger. The mechanism of the oxygen-induced initiation has not been investigated. Oxygen could be activated towards addition to a double bond by complexation of $Li^+$ to C=C or to $O_2$, and it could also generate a radical center on carbon by inducing electron transfer processes. Although one-electron oxidation of the peralkylated carborane anion is difficult, it might conceivably also intervene. In the presence of a standard radical initiator, AIBN or di-t-butyl peroxide, oxygen is not needed, and the chain end groups are those expected from these radical initiators.

The product polydispersity is high, as expected for radical polymerization. In the presence of 1-hexene, co-oligomerization is observed. The ack of reactivity of the anions with a short alkenyl chain, [n]1, n=2-4, is probably attributable to steric hindrance by the bulky —$C(BMe)_{11}^-$ anion substituent.

$Li^+$ salts catalyze other radical reactions as well. Indeed, the observation that the molecular weight of the oligomers of [n]2 is never very high suggests that the abstraction of allylic hydrogen, which leads to chain transfer, may be catalyzed nearly as much as the radical addition process itself.

A much improved synthesis of the functionalized carborane anions [n]2 has been discovered. The availability of the 1-lithiated derivative of the undecamethylated anion 3 has broad significance for the preparation of compounds containing the unusual —$C(BMe)_{11}^-$ substituent. The polymers of [n]2 obtained by room-temperature polymerization with AIBN as the initiator have molecular weights suitable for a possible use as solid lithium cation conductors, as well as other uses.

Based on the evidence collected, "spontaneous" $Li^+$-catalyzed oligomerization of [n]2 is believed to proceed by the radical mechanism and is initiated by ambient oxygen.

In the lithium salts [n]2, the polymerization substrate is somewhat special in that it carries its own catalyst. However, the present results have much wider implications because other lithium salts soluble in weakly coordinating solvents, such as $Li^+MeC(BMe)_{11}^-$, will activate even much simpler alkenes for radical addition and for other reactions.

EXAMPLE 1

Li Salt Catalyzed Polymerizations and Copolymerizations

Symbol Definition: PIB=poly(isobutylene), PVAc=poly(vinyl acetate), PEA=Poly(ethyl acrylate), PE=polyethylene, PP=polypropylene, Meth=methyl methacrylate, AIBN=azoisobutyronitrile, Hx=1-Hexyl.

Lithium carborane catalysts: $LiCB_{11}Me_{12}$ is prepared as described in PCT published application WO02/079210 and is further described in Moss et al. 2001; King et al. 1996; and Pospíšil et al. 1998. Additional methods for preparation of Lithium carborane and borane salts useful in this invention are provided in U.S. Pat. No. 5,731,470.

$[Cs^+][1\text{-Hexyl-}CB_{11}Et_9H_2^-]$: $[Cs^+][1\text{-hexyl-}CB_{11}H_{11}^-]$ (0.5 g) was combined with $CaH_2$ (5.0 g, 124 mmol) and sulfolane (30 mL) in a round bottom flask (250 mL) equipped with a stir bar. EtOTf (6.0 mL, 38 mmol) was added using a syringe pump over 15 d and the contents were stirred at room temperature. After 15 days, the mixture was diluted with $CH_2Cl_2$ (300 mL) and filtered through a coarse frit. The filtrate was quenched with 40 mL of 27% $NH_4OH$ and the $CH_2Cl_2$ was removed using a rotary evaporator. By addition of water (200 mL) a bi-layer was formed and the aqueous solution was extracted with 3×100 mL of EtOEt and countercurrent extracted (2×2) with 20% aqueous CsCl. The organic layers were collected and concentration under reduced pressure gave a thick oil of the product and sulfolane. The sulfolane was removed at 300 mm Hg/150° C. with a kugelrohr apparatus and the crude product recrystallized in 50 mL water and 100 mL acetone. Yield: 0.60 g.

$[Cs^+][1\text{-Hexyl-}CB_{11}Et_9Me_2]$: $[Cs^+][1\text{-hexyl-}CB_{11}Et_9H_2^-]$ (0.25 g) was combined with $CaH_2$ (4 g) and sulfolane (20 mL) in a round bottom flask (100 mL) equipped with a stir bar. MeOTf (5 mL) was added using a syringe pump over 4 d and the contents were stirred at room temperature. After 4 days, the mixture was diluted with $CH_2Cl_2$ (300 mL) and filtered through a coarse frit. The filtrate was quenched with 20 mL of 27% $NH_4OH$ and the $CH_2Cl_2$ was removed using a rotary evaporator. By addition of water (100 mL) a bi-layer was formed and the aqueous solution was extracted with 3×20 mL of EtOEt and countercurrent extracted (2×2) with 20% aqueous CsCl. The organic layers were collected and concentration under reduced pressure gave a thick oil of the product and sulfolane. The sulfolane was removed at 300 mm Hg/150° C. with a kugelrohr apparatus and the crude product recrystallized in 10 mL water and 50 mL acetone.

Tetraphenylphosphonium 3,5,6,7,8,9,10,11,12-nonaethyl-carba-closo-dodecaborate [PPh$_4^+$][3,5,6,7,8,9,10,11,12-Et$_9$CB$_{11}$H$_3^-$]: Cs$^+$CB$_{11}$H$_{12}$— (1.00 g, 3.62 mmol) was combined with CaH$_2$ (10.0 g, 250 mmol) and sulfolane (30 mL) in a round bottom flask (250 mL) equipped with a stir bar. EtOTf (8.0 mL, 50 mmol) was added using a syringe pump over 6 d and the contents were stirred at room temperature. After 6 days, the mixture was diluted with CH$_2$Cl$_2$ (300 mL) and filtered through a coarse frit. The filtrate was quenched with 40 mL of 27% NH$_4$OH and the CH$_2$Cl$_2$ was removed using a rotary evaporator. By addition of water (200 mL) a bi-layer was formed and the aqueous solution was extracted with 3×100 mL of EtOEt and countercurrent extracted (2×2) with 20% aqueous CsCl. The organic layers were collected and concentration under reduced pressure gave a thick oil of the product and sulfolane. The sulfolane was removed at 300 mm Hg/150° C. with a kugelrohr apparatus and the crude product recrystallized in 50 mL water and 100 mL acetone. Yield: 1.60 g (83% of the Cs$^+$ salt). {$^{11}$B}$^1$H NMR (Ph$_4$P$^+$) δ 8.05 [m, 1H, PC$_6$H$_5$], 7.82 [m, 4H, PC$_6$H$_5$], 1.73 [s, 1H, C(1)], 0.97 [s, 1H, B(2)], 0.95 [s, 1H, B(4)], 0.86 [t, 15H, CH$_3$(7-11)], 0.69 [t, 3H, CH$_3$(12)], 0.45 [q, 10H, CH$_2$(7-11)], 0.32 [m, 6H, CH$_2$ (3,5,6)], 0.25 [q, 2H, CH$_2$(12)]; $^{11}$B NMR δ 2.06 [s, B(12)], −5.03 [s, 5B, B(7-11)], −10.4 [br, 3B, B(3,5,6)], −19.45 [br, 2B, B(2,4)]; {$^1$H}$^{13}$C NMR δ 7.34 [s, CH2 (7-11)], 60.88 [s, C(1)], 118.98 [d, PC$_6$H$_5$], 132.45 [d, PC$_6$H$_5$], 135.21 [d, PC$_6$H$_5$], 136.77 [d, PC$_6$H$_5$]; ESI MS(−) m/z 397, expected isotopic distribution. IR (KBr) 2890, 2810, 1482, 1365, 1295, 1170, 915 cm$^{-1}$. Anal. Calcd for C$_{43}$H$_{68}$B$_{11}$P: C, 70.28; H, 9.33. Found: C, 70.30; H, 9.30.

[Cs$^+$][1-H—CB$_{11}$Et$_9$Me$_2^-$]: [Cs$^+$][1-H—CB$_{11}$Et$_9$H$_2^-$] was combined with CaH$_2$ and sulfolane in a round bottom flask (100 mL) equipped with a stir bar. MeOTf was added using a syringe pump over 4 d and the contents were stirred at room temperature. After 4 days, the mixture was diluted with CH$_2$Cl$_2$ and filtered through a coarse frit. The filtrate was quenched with 27% NH$_4$OH and the CH$_2$Cl$_2$ was removed using a rotary evaporator. By addition of water a bi-layer was formed and the aqueous solution was extracted with EtOEt and countercurrent extracted with 20% aqueous CsCl. The organic layers were collected and concentration under reduced pressure gave a thick oil of the product and sulfolane. The sulfolane was removed at 300 mm Hg/150° C. with a kugelrohr apparatus and the crude product recrystallized in water/acetone (1:9).

Cs$^+$ salts were converted to Li$^+$ salts as follows: the Cs+ salt was dissolved in diethyl ether (3×10 mL) and the ethereal layer was extracted three times with 20% aqueous LiCl and the LiCl solutions twice with ether. The solvent of the combined organic layers was removed under reduced pressure to give a solid that was dried overnight at 100° C. under reduced pressure.

Radical Polymerization of Polymer Precursors, e.g., Terminal Alkenes, using various Li$^+$ Salts:

General procedure: Either under air in dark or upon UV irradiation, or with triple freeze-pump-thaw degassing, as specified, a ~10% solution of the Li+ salt of the monomer in 1,2-dicholoroethane containing the stated percentage of an initiator by weight (10%) was added to the monomer (i.e., polymer precursor) (1 atm for gaseous monomers or 1M in solutions for liquid monomers) and stirred at room temperature (air or AIBN initiation), or heated to 80° C. (DTBP initiation) for the specified amount of time. The irradiation was done at room temperature in a Rayonet merry-go-round apparatus using a 450 W medium-pressure mercury lamp with a Pyrex filter. Most of the solvent was evaporated, a small sample for SEC analysis in THF removed, methanol (~5 mL) was added, and the precipitated polymer (230-470 mg) was filtered and dried. Evaporation of the filtrate afforded the catalyst in nearly quantitative yield. Their $^1$H and $^{13}$C NMR spectra were obtained and compared to those in literature.

General Procedure applied to polymerization of 1-hexene: A 10% solution of the Li$^+$ salt in 1,2-dichloroethane (or cyclohexane) containing the stated percentage of an initiator by weight (10%) was added to 1-hexene and the irradiation was done at room temperature in a Rayonet merry-go-round apparatus using a 450 W medium-pressure mercury lamp with a Pyrex filter. After 10 h, most of the solvent was evaporated, a small sample for SEC analysis in THF removed, methanol (~5 mL) was added, and the precipitated polymer (230-470 mg) was filtered and dried. Evaporation of the filtrate afforded the catalyst in nearly quantitative yield. Polyhexene prepared from various Li$^+$ salts was analyzed by $^1$H, $^{13}$C NMR and SEC. Radical Polymerization of monomers using Li$^+$CB$_{11}$Me$_{12}^-$.

Figure 12:
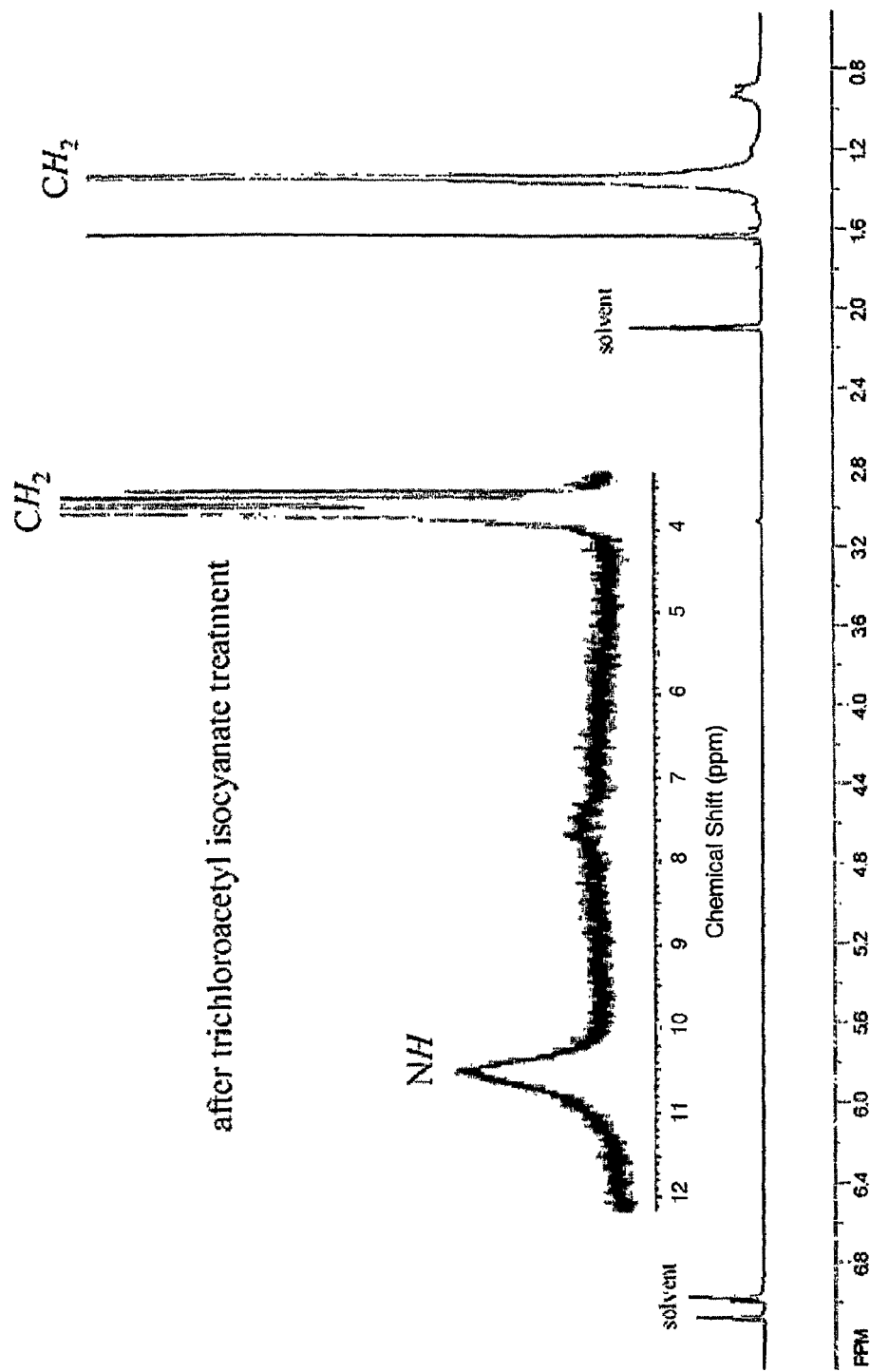
FIG. 12 shows a representative $^1H$ NMR spectrum of a copolymer prepared using the methods described herein.

Representative procedure for LiCB$_{11}$Me$_{12}$ catalyzed polymerization of 1-hexene: To a 1,2-dichloroethane (5 mL) solution of 1-hexene (420 mg), LiCB$_{11}$Me$_{12}$ (42 mg) was added and the contents were stirred at room temperature under ambient conditions. After 18 h, the poly-1-hexene was precipitated by addition of 5 mL of methanol. The polymer was filtered and dried under vacuum overnight. Evaporation of the filtrate yielded 40 mg of LiCB$_{11}$Me$_{12}$. FIG. 12 shows a representative $^1$H NMR spectrum of a polymer prepared using the methods described herein. The terminal hydroxyl end groups were quantitated after treatment with trichloroacetyl isocyanate. Other spectra were obtained but are not shown here (data are provided above).

Procedure for the Preparation of High Molecular Weight PIB using LiHxCB$_{11}$Et$_9$Me$_2$ as the Catalyst:

To a saturated degassed solution of isobutylene (5.0 g) in cyclohexane (50 mL), LiHxCB$_{11}$Et$_9$Me$_2$ (50 mg) and di-t-butyl peroxide (0.6 mL) were added and the contents were heated to 80° C. After 16 h, the poly(isobutylene) was precipitated by addition of 100 mL of methanol. The polymer (3.9 g, 78%) was recovered by filtration. It was dried at 200 milliTorr overnight. The catalyst (488 mg) was recovered by evaporation of the filtrate.

Procedure for the Preparation of High Molecular Weight PE using LiHxCB$_{11}$Et$_9$Me$_2$ as the Catalyst:

To a saturated degassed solution of ethylene (2.5 g) in cyclohexane (25 mL), LiHxCB$_{11}$Et$_9$Me$_2$ (25 mg) and di-t-butyl peroxide (0.3 mL) were added and the contents were heated to 80° C. After 19 h, the polyethylene was precipitated by addition of 50 mL of methanol. The polymer (1.9 g, 75%) was recovered by filtration. It was dried at 200 milliTorr overnight. The catalyst (240 mg) was recovered by the evaporation of the filtrate.

Procedure for the Preparation of High Molecular Weight PP using LiHxCB$_{11}$Et$_9$Me$_2$ as the Catalyst:

To a saturated degassed solution of propylene (2.5 g) in cyclohexane (25 mL), LiHxCB$_{11}$Et$_9$Me$_2$ (25 mg) and di-t-butyl peroxide (0.3 mL) were added and the contents were heated to 80° C. After 15 h, the polypolypropylene was precipitated by addition of 50 mL of methanol. The polymer (1.7 g, 70%) was recovered by filtration. It was dried at 200 milliTorr overnight. The catalyst (245 mg) was recovered by the evaporation of the filtrate.

Procedure for the Preparation of High Molecular Weight Polyhexene using LiHxCB$_{11}$Et$_9$Me$_2$ as the Catalyst:

To a degassed cyclohexane (5 mL) solution of 1-hexene (420 mg), LiHxCB$_{11}$Et$_9$Me$_2$ (4.2 mg), and di-t-butyl peroxide (0.06 mL) was added and the contents were heated to 80° C. After 18 h, the polyhexene was precipitated by addition of 10 mL of methanol. The polymer (340 mg, 80%) was recovered by filtration. It was dried at 200 milliTorr overnight. The catalyst (38 mg) was recovered by the evaporation of the filtrate.

Attempted preparation of polyhexene using LiBARF as the catalyst: To a 1,2-dichloroethane (5 mL) solution of 1-hexene (420 mg), LiBARF (solvent free, 42 mg) was added and the contents were stirred at room temperature in air under ambient conditions. After 42 h, no polymer was obtained.

To a degassed 1,2-dichloroethane (5 mL) solution of 1-hexene (420 mg), LiBARF (solvent free, 42 mg) and AIBN (10 mg) was added and the contents were stirred at room temperature. After 50 h, no polymer was obtained.

To a degassed 1,2-dichloroethane (5 mL) solution of 1-hexene (420 mg), LiBARF (solvent free, 42 mg) and di-t-butyl peroxide (0.06 mL) was added and the contents were heated to 80° C. After 50 h, no polymer was obtained.

Figure 3:
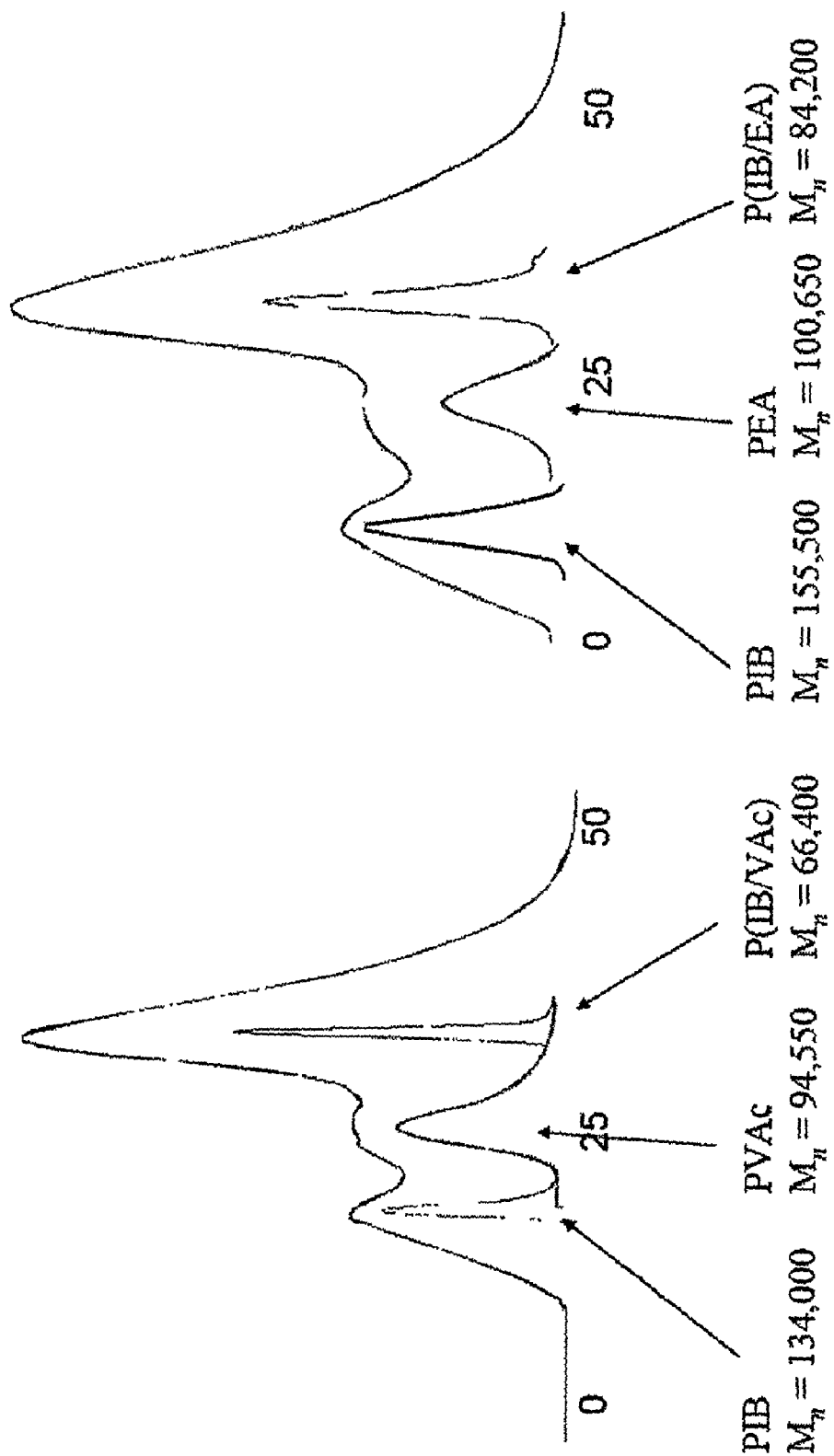
FIG. 3 shows the GPC results for copolymers, showing the presence of both homopolymers in addition to the copolymer.
Figure 4:
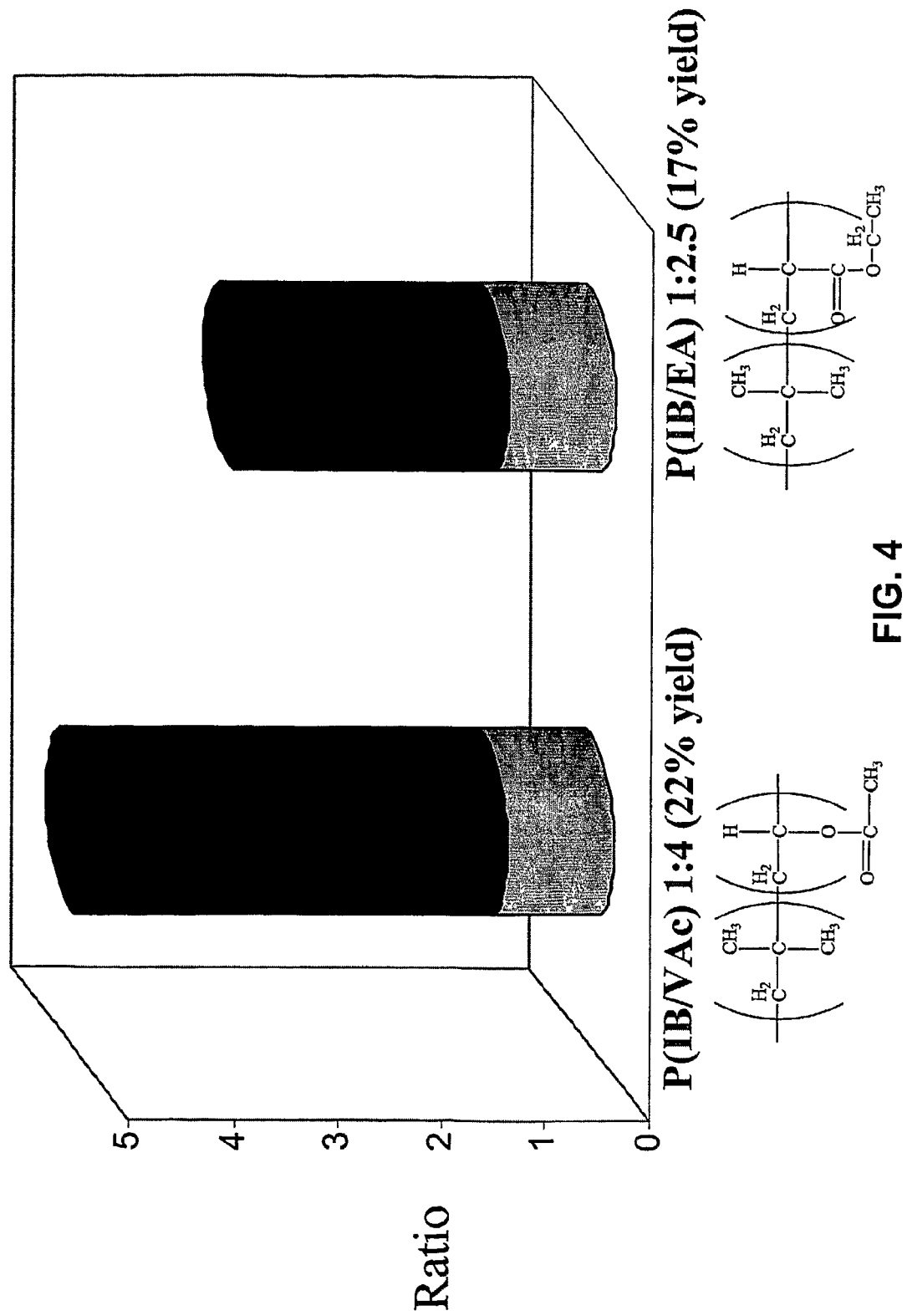
FIG. 4 shows the ratios of the polymers of isobutylene (bottom) and vinyl acetate (top) or ethyl acrylate (top) produced.
Figure 5:
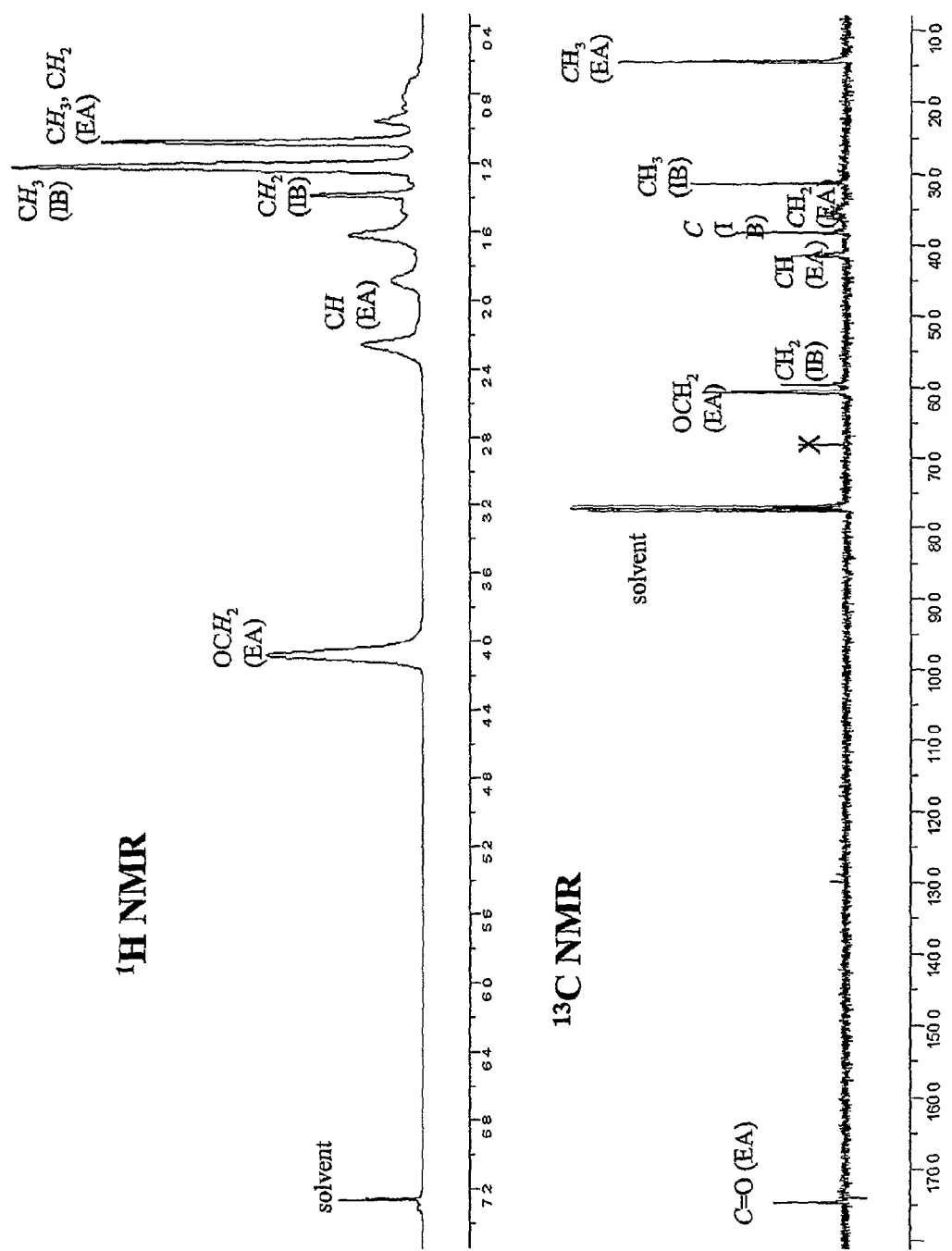
FIG. 5 shows $^1H$ NMR and $^{13}C$ NMR spectra for copolymers of isobutylene and ethyl acrylate.
Figure 6:
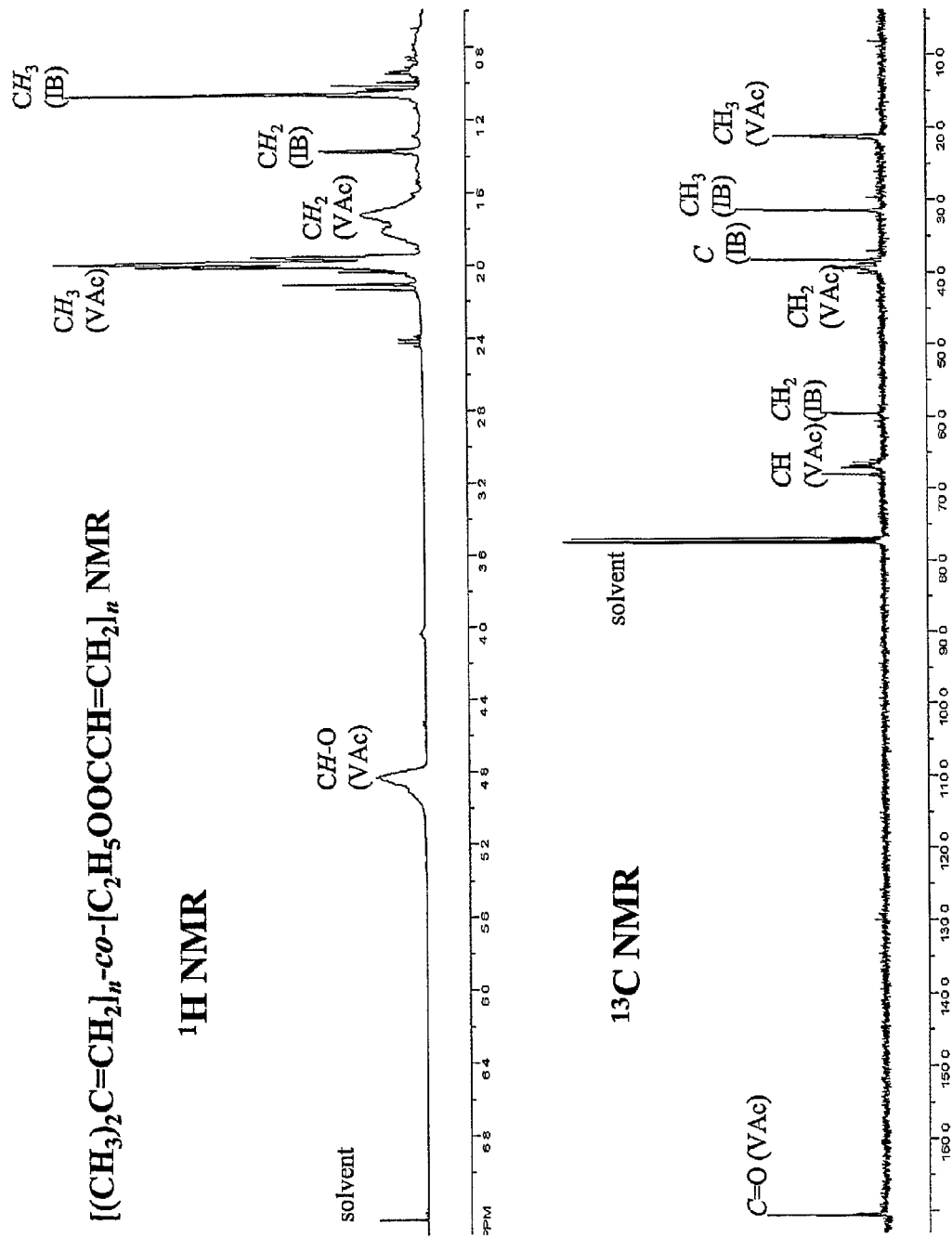
FIG. 6 shows $^1H$ NMR and $^{13}C$ NMR spectra for copolymers of isobutylene and vinyl acetate.
Figure 7:
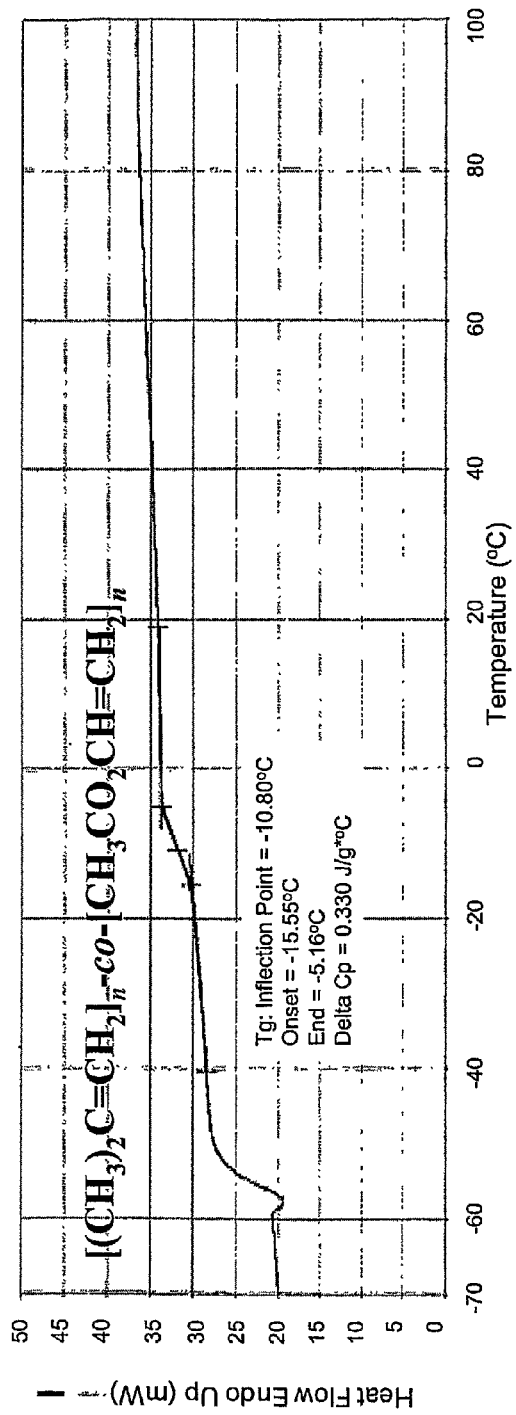
FIG. 7 shows DSC scans for copolymers of isobutylene/vinyl acetate and isobutylene/ethyl acrylate.
Figure 7:
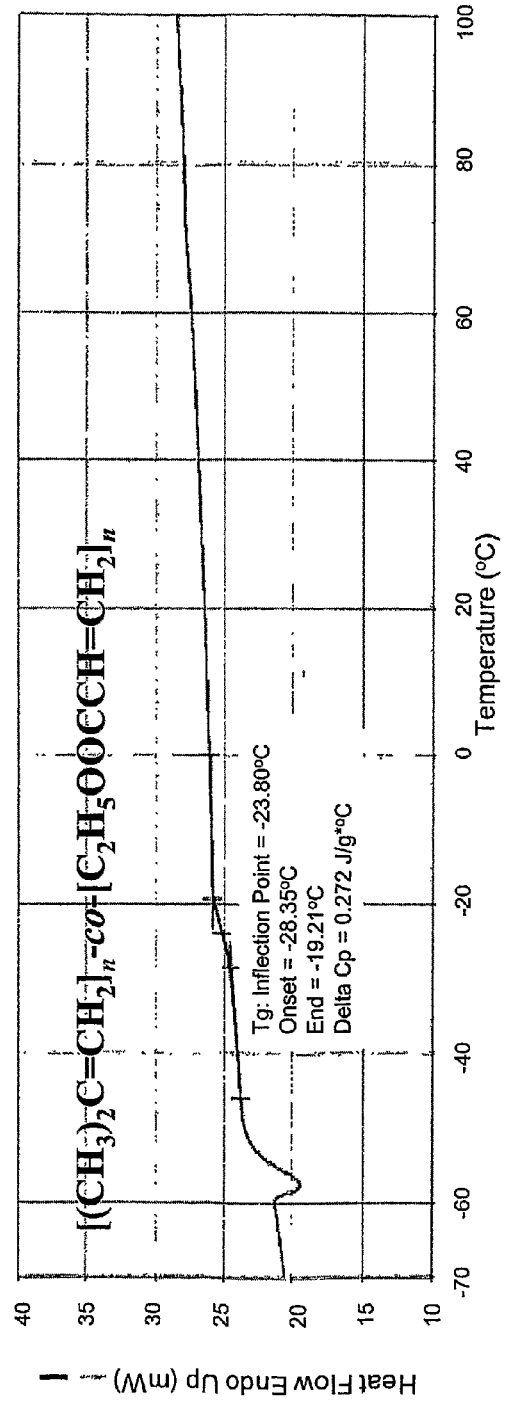
Figure 8:
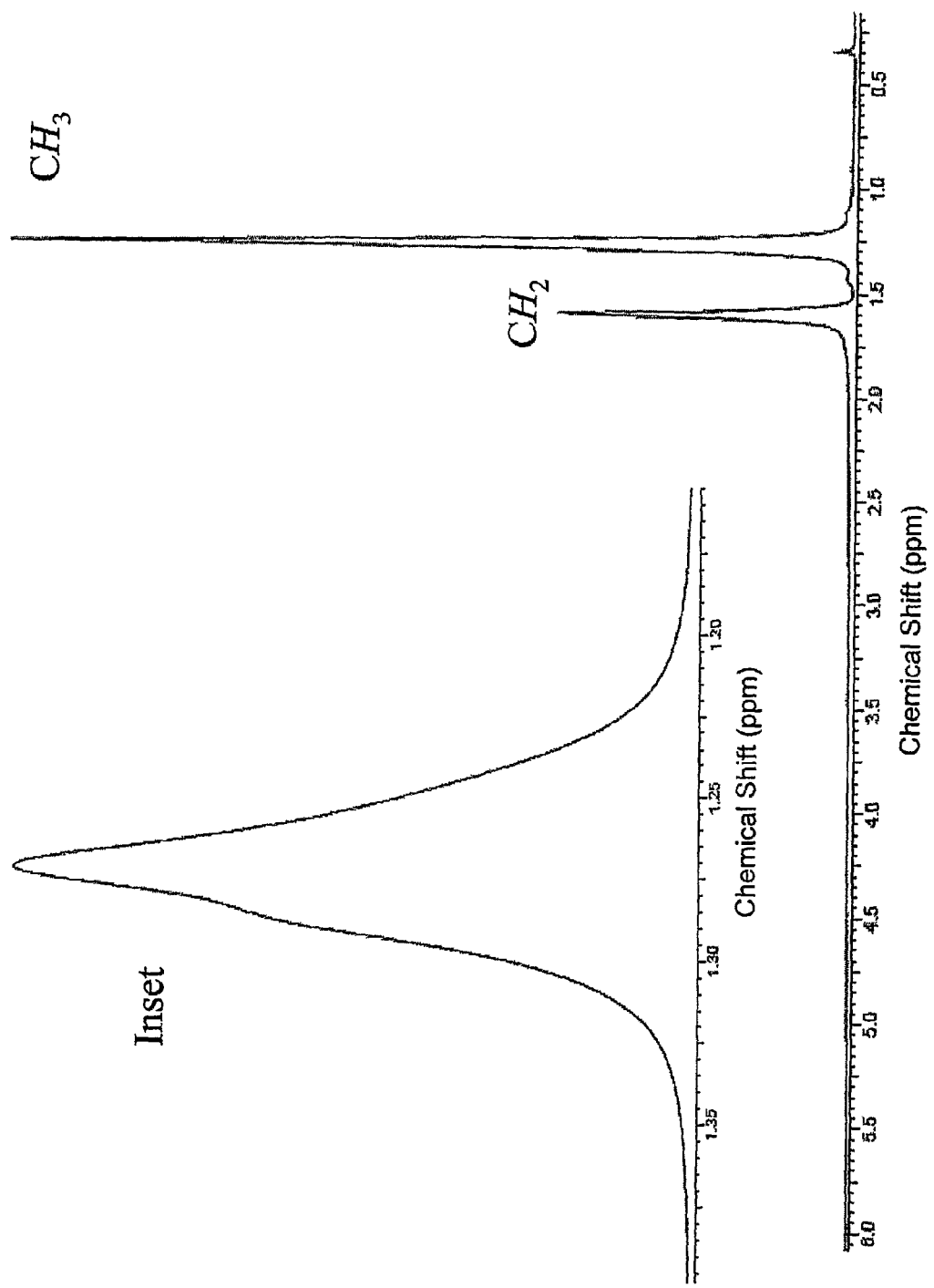
FIG. 8 shows the $^1H$ NMR spectrum of polyisobutylene prepared with $LiHxCB_{11}Et_9Me_2$ catalyst in $C_6D_6$.
Figure 9:
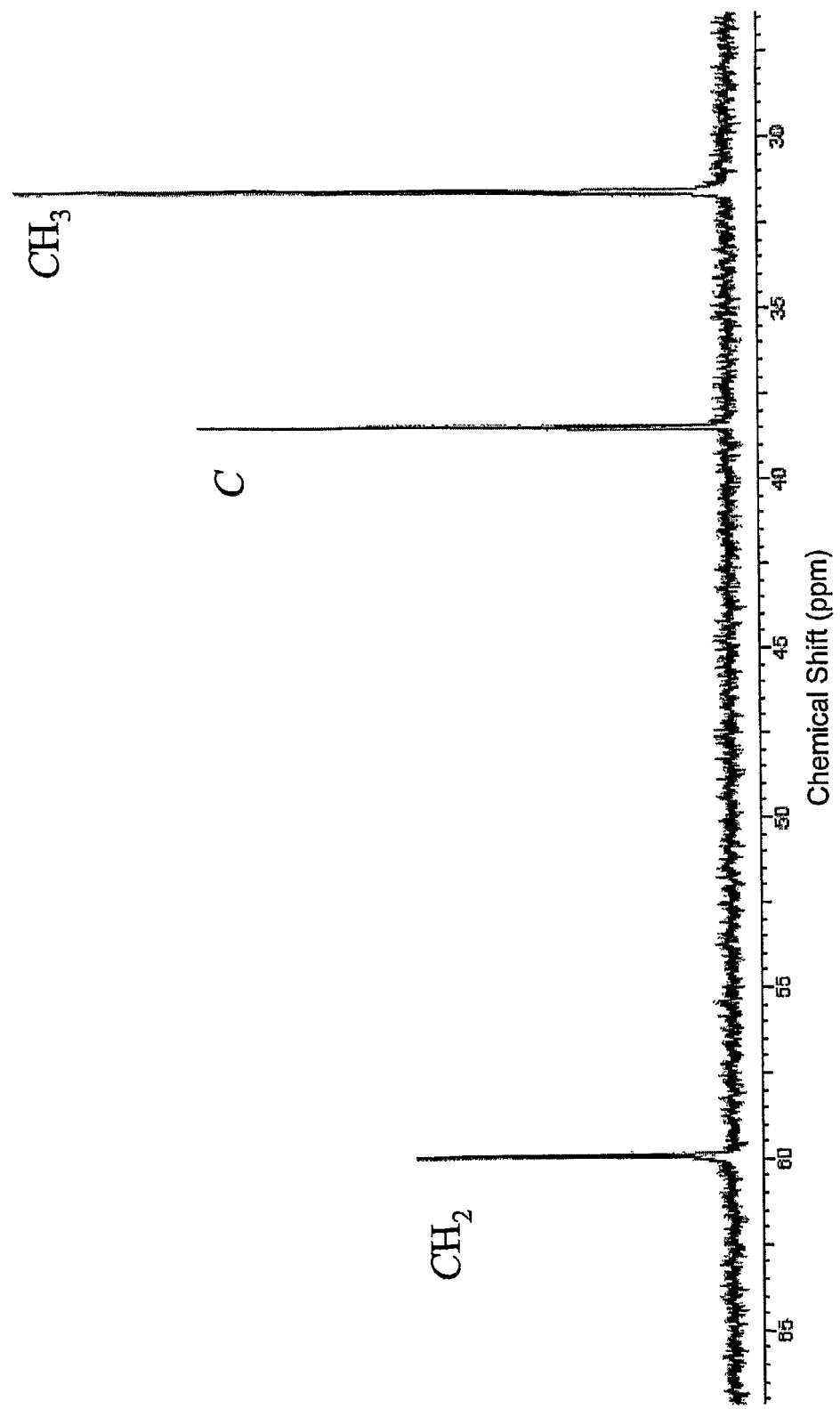
FIG. 9 shows the $^{13}C$ NMR spectrum of polyisobutylene prepared with $LiHxCB_{11}Et_9Me_2$ catalyst in $C_6D_6$ (see example in which benzene is employed as solvent).
Figure 10:
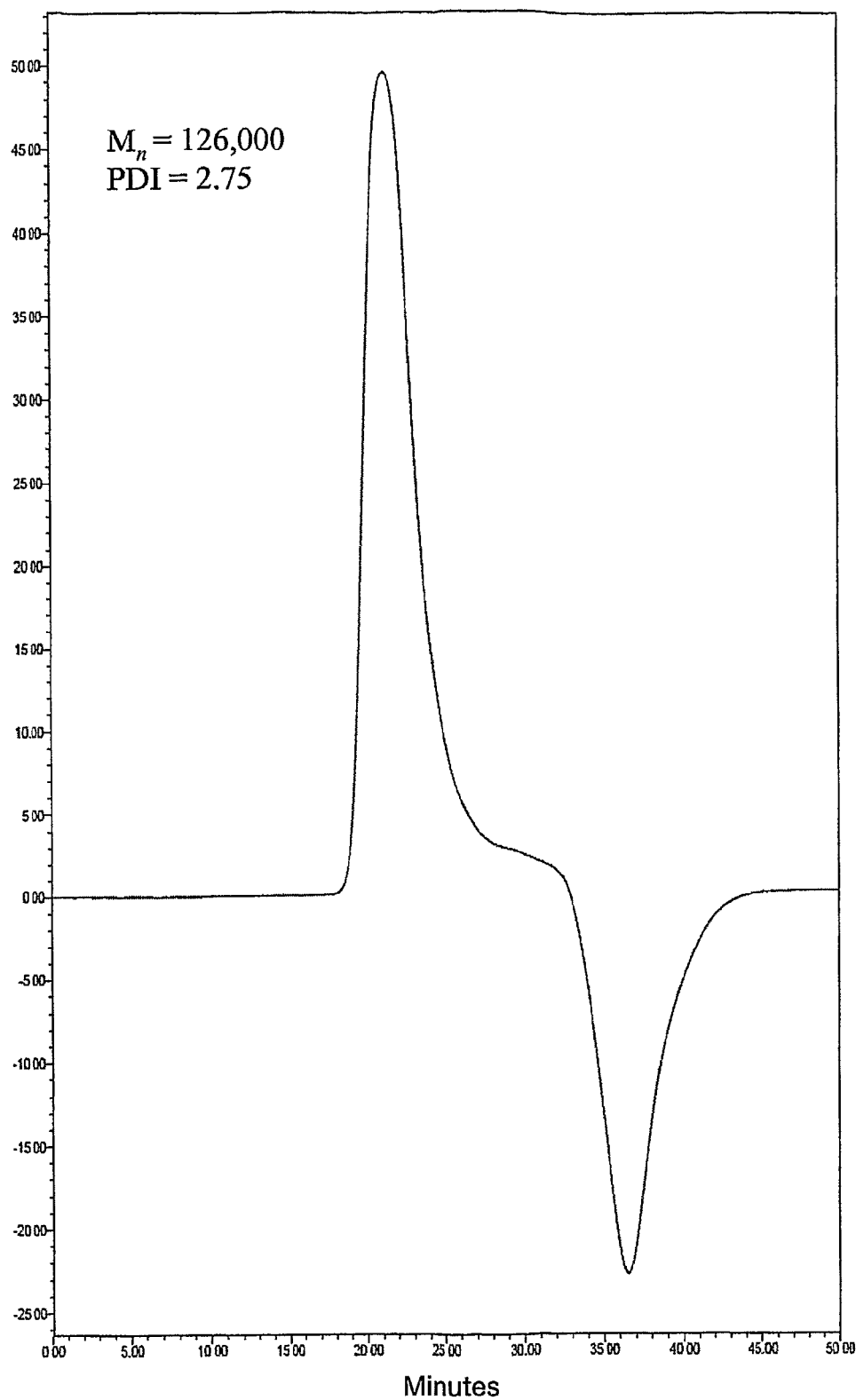
FIG. 10 shows the GPC of polyisobutylene prepared with $LiHxCB_{11}Et_9Me_2$ catalyst.

Procedure for the preparation of PIB-co-PVAc using LiCB$_{11}$Me$_{12}$ as the catalyst: To a saturated degassed solution of isobutylene (4.8 g) in 1,2-dichloroethane (50 mL), LiCB$_{11}$Me$_{12}$ (480 mg), vinyl acetate (freshly distilled, 7.4 g) and di-t-butyl peroxide (0.5 mL) were added and the contents were heated to 80° C. After 18 h, the volatiles were removed and the crude copolymer mixture was precipitated by addition of 50 mL of methanol. Poly(isobutylene) was removed by soxhlet extraction with petroleum ether for 12 h and poly(vinyl acetate) was removed with acetone extraction. The residual copolymer (0.72 g, 22%) was dried at 200 milliTorr overnight. The catalyst (472 mg) was recovered by evaporation of the filtrate of acetone extraction. FIG. 3 shows the GPC results for the copolymers, showing the presence of both homopolymers as well. FIG. 4 shows the ratios of the polymers of IB (bottom) and VAc (top) or EA (top) produced. FIG. 5 shows $^1$H NMR and $^{13}$C NMR spectra for copolymers of IB and EA. FIG. 6 shows $^1$H NMR and $^{13}$C NMR spectra for copolymers of IB and VAc. FIG. 7 shows DSC scans for copolymers of IB/VAc and IB/EA Procedure for the preparation of PIB-co-PEA using LiCB$_{11}$Me$_{12}$ as the catalyst: To a saturated degassed solution of isobutylene (4.9 g) in 1,2-dichloroethane (50 mL), LiCB$_{11}$Me$_{12}$ (490 mg), ethyl acrylate (freshly distilled, 8.6 g) and di-t-butyl peroxide (0.5 mL) were added and the contents were heated to 80° C. After 18 h, the volatiles were removed and the crude copolymer mixture was precipitated by addition of 50 mL of methanol. Poly(isobutylene) was removed by extraction with hexane and poly(ethyl acrylate) was removed by acetone extraction. The residual copolymer (0.65 g, 17%) was dried at 200 milliTorr overnight. The catalyst (485 mg) was recovered by evaporation of the filtrate of acetone extraction. FIG. 3 shows the GPC results for the copolymers, showing the presence of both homopolymers as well.

Procedure for the preparation of hexene-co-PVAc using LiCB$_{11}$Me$_{12}$ as the catalyst: To a degassed solution of 1-hexene (420 mg) in 1,2-dichloroethane (5 mL), LiCB$_{11}$Me$_{12}$ (42 mg), vinyl acetate (freshly distilled, 430 mg) and AIBN (10 mg) were added and the contents were stirred at RT. After 18 h, the volatiles were removed and the crude copolymer mixture was precipitated by addition of 10 mL of methanol. The copolymer (0.820 g, 88%) was dried at 200 milliTorr overnight. The catalyst (35 mg) was recovered by evaporation of the filtrate.

Procedure for the preparation of hexene-co-meth using LiCB$_{11}$Me$_{12}$ as the catalyst: To a degassed solution of 1-hexene (420 mg) in 1,2-dichloroethane (5 mL), LiCB$_{11}$Me$_{12}$ (42 mg), methyl methacrylate (freshly distilled, 500 mg) and AIBN (10 mg) were added and the contents were stirred at RT. After 18 h, the volatiles were removed and the crude copolymer mixture was precipitated by addition of 10 mL of methanol. The copolymer (0.890 g, 90%) was dried at 200 milliTorr overnight. The catalyst (38 mg) was recovered by evaporation of the filtrate.

Procedure for the preparation of Me$_3$SiCH=CH$_2$-co-VAc using LiCB$_{11}$Me$_{12}$ as the catalyst: To a degassed solution of vinyl trimethylsilane (420 mg) in 1,2-dichloroethane (5 mL), LiCB$_{11}$Me$_{12}$ (42 mg), vinyl acetate (freshly distilled, 370 mg) and AIBN (10 mg) were added and the contents were stirred at RT. After 18 h, the volatiles were removed and the crude copolymer mixture was precipitated by addition of 10 mL of methanol. The copolymer (0.78 g, 85%) was dried at 200 milliTorr overnight. The catalyst (40 mg) was recovered by evaporation of the filtrate.

Procedure for the preparation of Me$_3$SiCH=CH$_2$-co-meth using LiCB$_{11}$Me$_{12}$ as the catalyst: To a degassed solution of vinyl trimethylsilane (420 mg) in 1,2-dichloroethane (5 mL), LiCB$_{11}$Me$_{12}$ (42 mg), methyl methacrylate (freshly distilled, 410 mg) and AIBN (10 mg) were added and the contents were stirred at RT. After 18 h, the volatiles were removed and the crude copolymer mixture was precipitated by addition of 10 mL of methanol. The copolymer (0.81 g, 92%) was dried at 200 milliTorr overnight. The catalyst (40 mg) was recovered by evaporation of the filtrate

EXAMPLE 2

Radical Polymerization of Lithium Carborane Polymer Precursors

Experimental manipulations were carried out using standard vacuum and inert atmosphere techniques. Chemicals were reagent grade (Aldrich); some 1 was synthesized and some purchased from Katchem, Ltd., Eliŝky Krásnohorské 6, 11000 Prague 1, Czech Republic. THF was dried over sodium and distilled before use. The nickel catalyst 8, the titanium catalyst 9 and B(C$_6$F$_5$)$_3$ were prepared as described in the literature (Johnson et al. 1995; Scollard et al. 1996; and Massey and Park 1964, respectively) A 10% solution of MAO in toluene (Aldrich) was used. Proton shifts of BH protons were measured with boron decoupling. Chemical shifts are given in ppm (δ scale) with positive shifts downfield: all $^1$H chemical shifts were referenced relative to internal residual protons from a lock solvent and $^{11}$B shifts to BF$_3$.Et$_2$O [B(OMe)$_3$ at 18.1 ppm]. The external reference was contained in a capillary within the same tube. The NMR solvent was (CD$_3$)$_2$CO unless noted otherwise. Electrospray negative and positive ion mass spectra were measured in methanol (monomers) or THF (polymers). All chromatographic separations were performed on Sorbent Technologies C 18 (60 Å, 40 µm) reverse phase columns. TLC was performed on C 18 silica TLC Plates w/UV254 aluminum backed (150 µm), with detection by rhodamine 6G (ethanolic solution) in methanol/water (1:1). All the monomers were degassed by three freeze-pump-thaw cycles and stored in Schlenk tubes.

Figure 11:
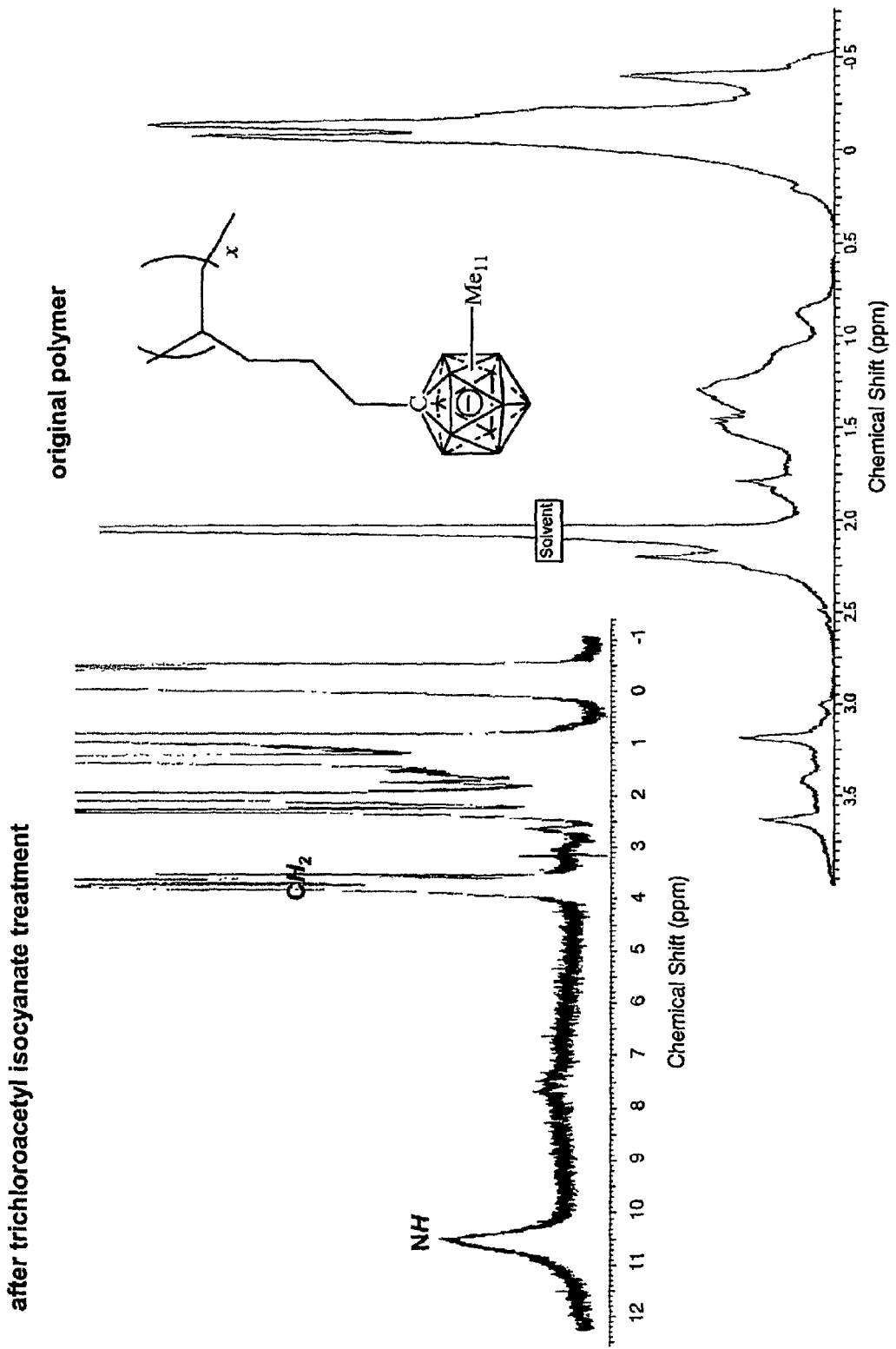
FIG. 11 shows a representative $^1H$ NMR spectrum of a copolymer prepared using the methods described herein.

FIG. 11 shows a representative $^1$H NMR spectrum of a polymer prepared using the methods described herein. Other spectra were obtained but are not shown here.

Gel Permeation Chromatography (GPC): Molecular weights and polydispersities of the polymers were determined in THF solutions by GPC at ambient temperature and calibrated against Waters polystyrene standards. A Waters Gel Permeation Chromatograph, differential refractometer, refractive index detector (RI 2414), and EMPOWER software were used, with a three-column bed (Styragel HR 4.6× 300 mm columns with 5 μm bead size, for molecular weight ranges 100-10 000, 500-30 000, and 5000-6 000 000) and a flow rate of 0.3 mL/min. The results were the same for the crude polymers and those precipitated from methanol.

Kinetics of AIBN Decomposition. The disappearance of AIBN (0.015 M) in a $C_6D_6$ solution, monitored by $^1$H NMR, followed first-order kinetics at room temperature (25° C.). The apparent rate constants k×$10^5$ s$^{-1}$ were: <0.005 for 0 M Li$^+$, (3.39±0.03) for 0.007 M Li$^+$, (7.15±0.10) for 0.015 M Li$^+$ (11.27±0.14) for 0.023 M Li$^+$ and (15.15±0.07) for 0.031 M Li$^+$. The errors shown are maximum deviations in three independent kinetic runs.

General Synthetic Procedures. Conversion to Lithium salts, Procedure P1. A Me$_3$NH$^+$ or Cs$^+$ salt was dissolved in diethyl ether (3×10 mL) and the ethereal layer was extracted three times with 20% aqueous LiCl and the LiCl solutions twice with ether. The solvent of the combined organic layers was removed under reduced pressure to give a solid that was dried overnight at 100° C. under reduced pressure.

Preparation of 1-LiC(BMe)$_{11}^-$ and $CH_2=CH(CH_2)_{n-2}C(BMe)_{11}^-Cs^+$([n]2), Procedure P2 (Table 4). At −78° C. under argon, 4 or 5 (1 eq) in 50 mL THF or toluene was treated with 1.6 M t-BuLi (1.6 M solution in pentane, 2.2 eq) and stirred for 15 min at that temperature. The resulting solution was cannulated into a solution of $CH_2=CH(CH_2)_nBr$ (2.5 eq) in THF or toluene at −20° C. and then kept either at room temperature or at reflux at 50° C. About 15-72 h later, reaction was quenched by the addition of water. The solvent was evaporated and [n]2 was extracted into diethyl ether (3×20 mL) followed by extraction with 20% aqueous CsCl (3×15 mL). After evaporation of the solvent, the resulting solid was purified by reverse phase column chromatography using a buffered water/methanol eluent (50% methanol, 50% water, each containing 0.7% of Et$_3$N and 1% AcOH). The preparation of compounds 4 and 5 is described in Vyakaranam 2006.

TABLE 4

Yields of Products [n]2 in General Procedure P2

| n | 4 g, mmol | t-BuLi mL, mmol | $CH_2=CH-(CH_2)_{n-2}-Br$ g, mmol | Time h | T °C. | [n]2 g, % |
|---|---|---|---|---|---|---|
| 3 | 0.100, 0.18 | 0.25, 0.40 | 0.055, 0.45 | 72 | 50 | 0.058, 69 |
| 4 | 0.075, 0.13 | 0.20, 0.29 | 0.045, 0.33 | 28 | RT | 0.042, 64 |
| 5 | 0.100, 0.18 | 0.25, 0.40 | 0.067, 0.45 | 20 | RT | 0.053, 58 |
| 6 | 0.050, 0.09 | 0.15, 0.20 | 0.036, 0.23 | 32 | RT | 0.030, 65 |
| 7 | 0.135, 0.24 | 0.35, 0.53 | 0.106, 0.60 | 15 | RT | 0.098, 77 |

Preparation of $Br(CH_2)_nC(BMe)_{11}^-Cs^+$([n]7), Procedure P3 (Table 5). At −78° C. under argon, 4 or 5 (1 eq) in 50 mL THF or toluene was treated with t-BuLi (1.6 M solution in pentane, 2.5 eq) and stirred for 15 min at that temperature. The resulting solution was cannulated into a solution of $Br(CH_2)_nBr$ (2.5 eq) in THF or toluene at −20° C. and then kept at room temperature. After 6-18 h, the reaction was quenched by the addition of water. The solvent was evaporated and the product was extracted into diethyl ether (3×20 mL) followed by extraction with 20% aqueous CsCl (3×15 mL). After evaporation of the solvent, the resulting solid was purified by reverse phase column chromatography using buffered water/methanol eluent (50% methanol, 50% water, each containing 0.7% of Et$_3$N and 1% AcOH).

Preparation of Cs$^+$[n]2 from [n]7, Procedure P4 (Table 6). At 0° C., 1.6 M n-BuLi (23.2 mL, 37.2 mmol) was added dropwise to TMP (6.31 mL, 37.2 mmol) in 20 mL benzene. After 5 min, the resulting LiTMP solution (5.0 eq) was cannulated to a stirred solution of Cs$^+$[n]7 (1 eq) in benzene at 50° C. The reaction was quenched after 45 min with 100 mL 25% CsCl (aq) and THF was evaporated under reduced pressure. The crude product was extracted from the resulting aqueous mixture with 3×100 mL of EtOEt and concentrated under reduced pressure. It was purified by chromatography and further recrystallized from acetone (100 mL) and water (30 mL) to give [n]7 as white crystals.

TABLE 5

Yields of Products [n]7 in General Procedure P3

| n | 4 g, mmol | t-BuLi mL, mmol | Br—(CH$_2$)$_n$—Br g, mmol | Time h | [n]7 g, % |
|---|---|---|---|---|---|
| 3 | 0.150, 0.27 | 0.45, 0.68 | 0.140, 0.68 | 6 | 0.112, 75 |
| 4 | 0.500, 0.90 | 1.50, 2.25 | 0.500, 2.25 | 9.5 | 0.410, 81 |
| 5 | 0.500, 0.90 | 1.50, 2.25 | 0.520, 2.25 | 15 | 0.340, 65 |
| 6 | 0.220, 0.40 | 0.65, 1.00 | 0.250, 1.00 | 12 | 0.200, 85 |
| 7 | 0.100, 0.18 | 0.25, 0.40 | 0.110, 0.40 | 18 | 0.086, 79 |

TABLE 6

Yields of Products [n]2 in General Procedure P4

| n | [n]7 g, mmol | LiTMP g, mmol | [n]2 g, % |
|---|---|---|---|
| 3 | 0.250, 0.45 | 0.34, 2.25 | 0.200, 93 |
| 4 | 0.340, 0.60 | 0.45, 3.00 | 0.280, 96 |
| 5 | 0.100, 0.17 | 0.13, 0.85 | 0.078, 91 |
| 6 | 0.100, 0.18 | 0.14, 0.90 | 0.075, 87 |
| 7 | 0.390, 0.64 | 0.48, 3.20 | 0.330, 98 |

Preparation of Cs$^+$[n]2 Using Alkenyl Tosylates, Procedure P5 (Table 7). At −78° C. under argon, 4 or 5 (1 eq) in 50 mL THF or toluene was treated with 1.6 M n-BuLi (1.7 M solution in pentane, 2.2 eq) and stirred for 15 min at that temperature. The resulting solution was cannulated into a solution of $CH_2=CH(CH_2)_nOTos$ (2.5 eq) in THF or toluene at −20° C. and then kept at room temperature. About 10-15 h later, the reaction was quenched by the addition of water. The solvent was evaporated and [n]2 was extracted into diethyl ether (3×20 mL) followed by extraction with 20% aqueous CsCl (3×15 mL). After evaporation of the solvent, the resulting solid was purified by recrystallization using MeOH/water (1:9).

TABLE 7

Yields of Products [n]2 in General Procedure P5

| n | 4 g, mmol | t-BuLi mL, mmol | CH$_2$=CH—(CH$_2$)$_{n-2}$—OTos g, mmol | Time h | [n]2 g, % |
|---|---|---|---|---|---|
| 3 | 0.075, 0.13 | 0.20, 0.29 | 0.070, 0.33 | 10 | 0.060, 95 |
| 4 | 0.050, 0.09 | 0.15, 0.20 | 0.052, 0.23 | 12 | 0.041, 92 |
| 5 | 0.100, 0.18 | 0.25, 0.40 | 0.108, 0.45 | 15 | 0.088, 98 |
| 6 | 0.100, 0.18 | 0.25, 0.40 | 0.115, 0.46 | 9 | 0.082, 89 |
| 7 | 0.050, 0.09 | 0.15, 0.20 | 0.062, 0.23 | 6 | 0.043, 91 |

Radical Polymerization of Li$^+$ salts of [n]2. Either under air in dark or upon UV irradiation, or with triple freeze-pump-thaw degassing, as specified, a ~10% solution of the Li$^+$ salt of the monomer in benzene (~15 mL) containing the stated percentage of an initiator by weight was allowed to stand at room temperature for the specified amount of time. The irradiation was done at room temperature in a Rayonet merry-go-round apparatus using a 450 W medium-pressure mercury lamp with a Pyrex filter.

Most of the solvent was evaporated, a small sample for GPC analysis in THF removed, methanol (~5 mL) was added, and the precipitated polymer was filtered and dried. The polymers are soluble in THF, benzene, acetonitrile, and acetone. Their $^1$H and $^{13}$C NMR spectra were very similar to those of the monomers, but vinylic resonances were absent.

Polymers from solid Li$^+$ salts in air (Spectra not shown). [5]2: $^1$H NMR (300 MHz) δ 2.74-0.90 (m), ~0.60-0.20 (m, BCH$_3$), 3.21 (m); $^{13}$C NMR (100 MHz) δ 52.80, 32.51, 27.55, 23.50, −3.26 (B—CH$_3$); $^{11}$B{$^1$H} NMR (96 MHz) δ 0.12, −8.23, −10.20; IR (KBr pellet) 566, 668, 730, 764, 832, 871, 900, 1026, 1084, 1103, 1142, 1253, 1268, 1287, 1302, 1379, 1408, 1147, 1631, 2338, 2357, 2827, 2890, 2924 cm$^{-1}$. [6]2: $^1$H NMR (300 MHz) δ 2.90-0.88 (m), −0.16-0.55 (m, BCH$_3$), 3.32 (m); $^{13}$C NMR (100 MHz) δ 53.01, 35.20, 33.22, 32.91, 27.80, −3.66 (B—CH$_3$); $^{11}$B{$^1$H} NMR (96 MHz) δ 0.15, −8.34, −10.39. IR (KBr pellet) 595, 704, 742, 915, 1035, 1149, 1257, 1312, 1377, 1388, 1426, 1480, 1502, 1632, 2360, 2827, 2897, 2924 cm$^{-1}$. [7]2: $^1$H NMR (300 MHz) δ 3.15-0.92 (m), −0.18-0.49 (m, BCH$_3$), 3.46 (m); $^{13}$C NMR (100 MHz) δ 55.05, 53.09, 51.24, 32.84, 31.25, 28.77, 27.50, 25.39, 22.24, −2.99 (B—CH$_3$); $^{11}$B{$^1$H} NMR (96 MHz) δ 0.23, −8.80, −11.25; IR (KBr pellet) 562, 638, 644, 785, 834, 877, 937, 1040, 1122, 1295, 1377, 1458, 1480, 1627, 2349, 2533, 2827, 2859, 2930 cm$^{-1}$.

Polymers from benzene solutions of Li$^+$ salts in air (Spectra not shown). [5]2: $^1$H NMR (300 MHz) δ 2.90-1.05 (m), −0.50-0.15 (m, BCH$_3$), 3.35 (m); $^{13}$C NMR (100 MHz) δ 53.25, 33.24, 28.09, 23.99, −3.51 (B—CH$_3$); $^{11}$B{$^1$H} NMR (96 MHz) δ 0.15, −8.44, −10.15; IR (KBr pellet) 534, 685, 696, 810, 871, 900, 1004, 1056, 1390, 1466, 1487, 1577, 1622, 2550, 2593, 2872, 2897, 2920 cm$^1$. [6]2: $^1$H NMR (300 MHz) δ 3.05-0.95 (m), −0.10-0.49 (m, BCH$_3$), 3.44 (m); $^{13}$C NMR (100 MHz) δ 651.05, 38.88, 35.80, 33.10, 27.10, −3.10 (B—CH$_3$); $^{11}$B{$^1$H} NMR (96 MHz) δ0.10, −8.10, −10.25; IR (KBr pellet) 754, 923, 1275, 1344, 1409, 1678, 2839, 2950 cm$^{-1}$. [7]2: $^1$H NMR (300 MHz) δ 3.22-1.05 (m), −0.05-0.50 (m, BCH$_3$), 3.55 (m); $^{13}$C NMR (100 MHz) δ 58.46, 50.25, 36.77, 34.60, 32.11, 28.08, 23.50, −3.55 (B—CH$_3$); $^{11}$B{$^1$H} NMR (96 MHz) δ 0.31, −8.55, −11.01; IR (KBr pellet) 698, 723, 762, 1008, 1049, 1160, 1231, 1367, 1404, 1487, 1707, 2541, 2808, 2890 cm$^{-1}$.

Polymers from Li$^+$ salts in benzene with AIBN (Spectra not shown). [5]2: $^1$H NMR (300 MHz) δ 3.05-0.1.10 (m), −0.52-0.20 (m, BCH$_3$); $^{13}$C NMR (100 MHz) δ 68.34, 53.45, 32.36, 31.06, 28.49, −2.52 (B—CH$_3$); $^{11}$B{$^1$H} NMR (96 MHz) δ 0.12, −9.11, −10.50; IR (KBr pellet) 754, 824, 845, 1155, 1240, 1390, 1603, 2588, 2844, 2960 cm$^{-1}$. [6]2: in benzene with AIBN. $^1$H NMR (300 MHz) δ 3.30-1.15 (m), −0.21-0.50 (m, BCH$_3$); $^{13}$C NMR (100 MHz) δ 63.88, 53.55, 35.81, 32.78, 30.66, 27.65, 25.50, −1.90 (B—CH$_3$); $^{11}$B{$^1$H} NMR (96 MHz) δ 0.18, −8.66, −11.05; IR (KBr pellet) 480, 546, 625, 709, 758, 814, 1088, 1128, 1247, 1393, 1600, 2601, 2953 cm$^{-1}$. [7]2: $^1$H NMR (300 MHz) δ 3.40-1.30 (m), −0.40-0.16 (m, BCH$_3$); $^{13}$C NMR (100 MHz) δ 72.34, 55.50, 53.88, 34.10, 33.92, 31.09, 28.32, 27.41, −2.55 (B—CH$_3$); $^{11}$B{$^1$H} NMR (96 MHz) δ 0.19, −8.15, −10.56; IR (KBr pellet) 519, 559, 621, 677, 718, 754, 812, 837, 1114, 1249, 2604, 2952 cm$^{-1}$.

Polymers from Li$^+$ salts irradiated in 1,2-dichloroethane with (t-BuO)$_2$ (characterization spectra not shown). [5]2: $^1$H NMR (300 MHz) δ 3.27-1.60 (m), −0.55-0.28 (m, B—CH$_3$); $^{13}$C NMR (100 MHz) δ 60.09, 55.65, 52.34, 45.09, 38.22, 24.22, 18.39, −3.08 (B—CH$_3$); $^{11}$B{$^1$H} NMR (96 MHz) δ 0.18, −8.80, −10.22; IR (KBr pellet) 492, 503, 557, 660, 725, 883, 910, 1013, 1051, 1089, 1382, 1464, 1600, 2506, 2577, 2859, 2914, 2941 cm$^{-1}$. [6]2: $^1$H NMR (300 MHz) δ 3.50-1.22 (m), −0.62-0.01 (m, B—CH$_3$); $^{13}$C NMR (100 MHz) δ 64.75, 53.20, 50.39, 34.15, 32.10, 28.85, 22.05, −3.85 (B—CH$_3$); $^{11}$B{$^1$H} NMR (96 MHz) δ 0.11, −8.70, −10.50; IR (KBr pellet) 611, 736, 780, 921, 970, 1095, 1143, 1301, 1388, 1426, 1627, 2468, 2533, 2827, 2892, 2919 cm$^{-1}$. [7]2: $^1$H NMR (300 MHz) δ 3.44-1.51 (m), −0.60-0.00 (m, B—CH$_3$); $^{13}$C NMR (100 MHz) δ 61.01, 57.83, 53.90, 43.75, 33.58, 31.87, 27.60, 26.40, −3.50 (B—CH$_3$); $^{11}$B{$^1$H} NMR (96 MHz) δ 0.10, −8.05, −10.20; IR (KBr pellet) 655, 736, 866, 1008, 1138, 1306, 1377, 1594, 1632, 2501, 2827, 2903, 2935 cm$^{-1}$.

Other Polymerization Experiments. To a ~10% solution of the Li$^+$ salt of [5]2 in 1,2 dichloroethane (~15 mL) was added a stoichometric amount of hydroquinone or TEMPO and the contents were heated to reflux. After 16 h, the samples were analyzed by $^1$H NMR spectroscopy and GPC and no polymer was detected. In a similar experiment in THF solvent, even without a radical trap, no polymer was formed.

To a ~10% solution of the Li$^+$ salt of [5]2 in 1,2 dichloroethane (~15 mL) was added a stoichometric amount of 12-crown-4 and the contents were stirred at RT for four days. No polymer formation was observed by $^1$H NMR spectroscopy.

A ~10% solution of the Na$^+$ or Cs$^+$ salt of [5]2 in benzene was left for 2 days at RT and the progress of the reaction was monitored by $^1$H NMR spectroscopy. No polymer formation was observed. To a ~10% solution of the Li$^+$ salt of [5]2 in benzene (~15 mL) was added 10% AIBN by weight and 0.1 mL of t-BuOLi (1M solution in hexanes). The contents were heated to reflux and after 18 h the polymer formed was precipitated from methanol and characterized by $^1$H NMR spectroscopy. Similar experiments were conducted with 1% CH$_3$OD and 10% AIBN by weight and with 1% CD$_3$OD and 10% AIBN by weight at room temperature. Polymers were obtained after 8 h and 10 h, respectively, and characterized by NMR spectroscopy.

Nickel-Catalyzed Polymerization of [n]2. Under an argon atmosphere the nickel catalyst 8 (5 mg) was dissolved in anhydrous dichloroethane (40 mL) and stirred for 30 min at room temperature. Then the Cs$^+$ salt of the monomer [n]2 (100 mg) in dichloroethane (5 mL) was added and stirring was continued. After 18 (n=5) or two (n=6) h the reaction was quenched by the addition of water. The organic layer was separated and the solvent removed under reduced pressure. The residue was dissolved in THF and filtered. The THF was removed and the resulting solid was dried under reduced pressure. The yields were ~50%, and the molecular weights ($M_w$) were 1700-1800.

Titanium-Catalyzed Polymerization of [n]2. Under an argon atmosphere the titanium catalyst 9 (7 mg), B(C$_6$F$_5$)$_3$ (10 mg) and the Cs$^+$ salt of the monomer [5]2 (100 mg) were dissolved in anhydrous CH$_2$Cl$_2$ (5 mL). The reaction mixture was stirred for either 0.5 or 48 h, with identical results, and then quenched by the addition of a 1 M solution of HCl (3 mL). The mixture was extracted with hexanes, the solvent was removed and the resulting solid was dried under reduced pressure. Molecular weights ($M_w$) were 1900-2600. The same process, using 2 mg of 9, 3 mg of B(C$_6$F$_5$)$_3$, 20 mg of the Cs$^+$ salt of [6]2 and an 18 h reaction time, yielded an oligomer with $M_w$=~2400.

When a group of substituents is disclosed herein, it is understood that all individual members of those groups and all subgroups, including any isomers and enantiomers of the group members, and classes of compounds that can be formed using the substituents are disclosed separately. When a compound is claimed, it should be understood that compounds known in the art including the compounds disclosed in the references disclosed herein are not intended to be included. When a Markush group or other grouping is used herein, all individual members of the group and all combinations and subcombinations possible of the group are intended to be individually included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In general the terms and phrases used herein have their art-recognized meaning, which can be found by reference to standard texts, journal references and contexts known to those skilled in the art. The definitions provided are intended to clarify their specific use in the context of the invention.

Although the description provided contains many specificities, these should not be construed as limiting the scope of the invention, but as merely providing illustrations of some of the preferred embodiments of the invention. For example, anions, monomers, solvents, and polymerizing conditions other than those specifically exemplified herein may be used, as known to one of ordinary skill in the art without undue experimentation. Additional embodiments are within the scope of the invention. Chemical synthesis methods to prepare all components are known to one of ordinary skill in the art using the information provided and that information known to one of ordinary skill in the art. Additional embodiments and examples are intended to be included.

Every formulation or combination of components described or exemplified can be used to practice the invention, unless otherwise stated. Specific names of molecules are intended to be exemplary, as it is known that one of ordinary skill in the art can name the same molecules differently. When a molecule is described herein such that a particular isomer or enantiomer of the molecule is not specified, for example, in a formula or in a chemical name, that description is intended to include each isomer and enantiomer of the molecule described individually or in any combination. One of ordinary skill in the art will appreciate that methods, device elements, starting materials, synthetic methods, and polymerization methods other than those specifically exemplified can be employed in the practice of the invention without resort to undue experimentation. All art-known functional equivalents, of any such methods, starting materials, synthetic methods, and polymerization methods are intended to be included in this invention. Whenever a range is given in the specification, for example, a temperature range, a pressure range, a degree of polymerization range, a time range, or a composition range, all intermediate ranges and subranges, as well as all individual values included in the ranges given are intended to be included in the disclosure.

All patents and publications mentioned in the specification are indicative of the levels of skill of those skilled in the art to which the invention pertains. One skilled in the art would readily appreciate that the present invention is well adapted to carry out the objects and obtain the ends and advantages mentioned, as well as those inherent therein. The molecules and methods and accessory methods described herein as presently representative of preferred embodiments are exemplary and are not intended as limitations on the scope of the invention. Changes therein and other uses will occur to those skilled in the art, which are encompassed within the spirit and scope of the invention.

All references cited herein are hereby incorporated by reference to the extent that there is no inconsistency with the disclosure of this specification. Some references provided herein are incorporated by reference herein to provide details concerning additional starting materials, additional methods of synthesis, additional methods of analysis, additional anion examples and additional uses of the invention.

REFERENCES

Vyakaranam, K.; Barbour, J. B.; Michl, J. J. Am. Chem. Soc. 2006, 128, 5610.

Clark, T., J. Chem. Soc., Chem. Commun., pp. 1774-1776, 1986

Denisov, E. T., Russian Chem. Rev. 69(2):153-164, 2000

Fischer, H. et al., Angew. Chem. Int. Ed. 40:1340-1371, 2001

Flemmig, B. et al., J. Phys. Chem. A 108:2972-2981, 2004

Fu, Y. et al., Res. Chem. Intermed. 30(3):279-286, 2004

Korchowiec, J. et al., J. Phys. Chem. A 102:6682-6689, 1998

Krossing, I. et al., Angew. Chem. Int. Ed. 43:2066-2090, 2004

Olleta, A. C. et al., Phys. Chem. Chem. Phys. 6:5362-5369, 2004

Reed, C. A., Acc. Chem. Res. 31:133-139, 1998

Schürer, G. et al., Chem. Commun., pp. 257-258, 1998

Sekušak, S. et al., J. Phys. Chem. A 102:1583-1594, 1998

Shaik, S. et al., Eur. J. Inorg. Chem., pp. 207-226, 2004

Strauss, S. H., Chem. Rev. 93:927-942, 1993

Van Speybroeck, V. et al. ChemPhysChem 2005, 6, 180-189

Vyakaranam; Körbe, S.; Divišova, H.; Michl, J. J. Am. Chem. Soc. 2004, 126, 15795-15801.

Wong, M. W. et al., J. Phys. Chem. A 1998 102, 2237-2245.

U.S. Pat. Nos. 5,504,048; 5,173,464; 6,800,705; 5,739,073; 4,129,558; 4,046,745; 6,828,268.

Moad, G.; Solomon, D. H. The Chemistry of Free Radical Polymerization; Pergamon: Oxford, 1995.

McKnight, A. L.; Waymouth, R. M. Chem. Rev. 1998, 98, 2587.

Gibson, V. C.; Spitzmesser, S. K. Chem. Rev. 2003, 103, 283.

Cheradame, H. In Cationic Polymerization and Related Processes, Goethals, E. J., Ed., Academic Press: New York, 1984, pp 49-67.

Sangalov, Yu, A.; Minsker, K. S.; Zaikov, G. E. Polymers Derived from Isobutylene. Synthesis, Properties, Applications. VSP: Utrecht, The Netherlands, 2001.

Bamford, C. H.; Jenkins, A. D.; Johnston, R. Proc. Roy. Soc. (London) 1957, A241, 364.

Bartoň, J.; Borsig, E. Complexes in Free Radical Polymerization, Elsevier: Amsterdam, The Netherlands, 1988, (a) pp 148-165; (b) pp 127-129.

Renaud, P.; Gerster, M. Angew. Chem. Int. Ed. 1998, 37, 2562.

Ray, B.; Isobe, Y.; Morioka, K.; Habaue, S.; Okamoto, Y.; Kamigaito, M.; Sawamoto, M. Macromolecules 2003, 36, 543.

Lutz, J.-F.; Kirci, B.; Matyjaszewski, K. Macromolecules 2003, 36, 3136.

Lutz, J.-F.; Jakubowski, W.; Matyjaszewski, K. Macromol. Rapid. Commun. 2004, 25, 486.

Moss, S.; King, B. T.; de Meijere, A.; Kozhushkov, S. I.; Eaton, P. E.; Michl, J. Org. Lett. 2001, 3, 2375.

King, B. T.; Janousek, Z.; Grüner, B.; Trammel, M.; Noll, B. C.; Michl, J. J. Am. Chem. Soc. 1996, 118, 3313.

Pospíšil, L.; King, B. T.; Michl, J. Electrochim. Acta 1998, 44, 103.

Braun, R.; Sauer, J. Chem. Ber. 1986, 119, 1269.

Grieco, P. A. In Organic Chemistry: Its Language and its State of the Art; Kisakürek, M. V., Ed.; VCH: New York, 1993; p 133.

Saito, S. In Lewis Acids in Organic Synthesis; Yamamoto, H., Ed.; Wiley-VCH: Weinheim, Germany, 2000; Vol. 1, p 9.

Kumar, A. Chem. Rev. 2001, 101, 1.

Vyakaranam, K.; Körbe, S.; Divišová, H.; Michl, J. J. Am. Chem. Soc. 2004, 126, 15795.

Vyakaranam, K.; Körbe, S.; Michl, J., J. Am. Chem. Soc. 2006, 128, 5680.

Brandolini, A. J.; Hills, D. D. NMR Spectra of Polymers and Polymer Additives; Marcel Dekker New York, 2000.

Asakura, T.; Demura, M.; Nishiyama, Y. Macromolecules, 1991, 24, 2334.

Chen, H. Y. Anal. Chem. 1962, 34, 1793.

Grossman, G.; Yamada, A.; Vogl, O. J. Macromolecular Sci., Chemistry, 1981, A16, 897.

Tanaka, Y., J. Appl. Polym. Sci. Appl. Polym. Symp. 1989, 44, 1.

Yen, T. F. J. Poly. Sci., 1959, 35, 533.

Ricci, G.; Morganti, D.; Sommazzi, A.; Santi, R.; Masi, F. J. Mol. Cat. A: Chemical. 2003, 204-205, 287.

Goodlett, V. W. Anal. Chem. 1965, 37, 431.

Simionescu, C. I.; Percec, V.; Dumitrescu, S. J. Polym. Sci., Polym. Chem. Ed. 1977, 15, 2497.

Katz, T. J.; Lee, S. J. J. Am. Chem. Soc., 1980, 102, 422.

Cataldo, F. Polym. Int. 1996, 39, 91.

Petit, A.; Moulay, S.; Aouak, T. Eur. Polym. J. 1999, 35, 953.

Clayton, J. R., M. S. Thesis, University of Colorado, Boulder, 1999.

Tsang, C.-W., Xie, Z. Chem. Commun. 2000, 19, 1839.

Clarke, A. J.; Ingleson, M. J.; Kociok-Kohn, G.; Mahon, M. F.; Patmore, N. J.; Rourke, J. P.; Ruggiero, G. D.; Weller, A. S. J. Am. Chem. Soc. 2004, 126, 1503.

King, B. T.; Zharov, I.; Michl, J. Chem. Innov. 2001, 31, 23.

Jelinek, T.; Baldwin, P.; Scheidt, W. R.; Reed, C. A. Inorg. Chem. 1993, 32, 1982.

Michl, J.; King, B. T.; Janoušek, Z. U.S. Pat. No. 5,731,470, Mar. 24, 1998.

Tsang, C.-W., Xie, Z., Chem. Commun. 2000, 19, 1839.

Clarke, A. J.; Ingleson, M. J.; Kociok-Kohn, G.; Mahon, M. F.; Patmore, N. J.; Rourke, J. P.; Ruggiero, G. D.; Weller, A. S., J. Am. Chem. Soc. 2004, 126, 1503.

Johnson, L. K.; Killian, C. M.; Brookhart, M., J. Am. Chem. Soc. 1995, 117, 6414.

Scollard, J. D.; McConville, D. H.; Payne, N. C.; Vittal, J. J., Macromolecules 1996, 29, 5241.

Scollard, J. D.; McConville, D. H., J. Am. Chem. Soc. 1996, 118, 10008.

Janoušek, Z.; Lehmann, U.; Častulík, J.; Císařová, I.; Michl, J. J. Am. Chem. Soc. 2004, 126, 4060.

King, B. T.; Noll, B. C.; Michl, J. Collect. Czech. Chem. Commun. 1999, 64, 1001.

Zharov, I.; King, B. T.; Havlas, Z.; Pardi, A.; Michl, J. J. Am. Chem. Soc. 2000, 122, 10253.

Zharov, I.; Weng, T.; Orendt, A. M.; Barich, D. H.; Penner-Hahn, J.; Grant, D. M.; Havlas, Z.; Michl, J. J. Am. Chem. Soc. 2004, 126, 12033.

Ingleson, M. J.; Kociok Köhn, G.; Weller, A. S. Inorg Chim Acta 2005, 358, 1571.

Zharov, I.; Havlas, Z.; Orendt, A. M.; Barich, D. H.; Grant, D. M.; Fete, M. G.; Michl, J. J. Am. Chem. Soc. 2006, 128, 6089.

Horn, A. H. C.; Clark, T. J. Am. Chem. Soc. 2003, 125, 2809.

King, B. T.; Noll, B. C.; McKinley, A. J.; Michl, J. J. Am. Chem. Soc. 1996, 118, 10902.

Yates, B. F; Bouma, W. J.; MacLeod, J. K.; Radom, L. J. Chem. Soc. Chem. Commun. 1987, 204.

Griller, D.; Ingold, K. U. Acc. Chem. Res. 1980, 13, 317.

Martin, N. Tetrahedron 1993, 49, 1151.

Chen, J.; Xia, C.; Xin, J.; Cui, J.; Li, S. Progr. Chem. 2001, 13, 376.

Franken, A.; King, B. T.; Rudolph, J.; Rao, P.; Noll, B. C.; Michl, J. Collect. Czech. Chem. Commun. 2001, 66, 1238.

Massey, A. G.; Park, A. J. J. Organomet. Chem. 1964, 2, 245.

Vyakaranam K., Janoušek Z., Eriksson L. and Michl J., "Preparation of Undecamethylated and Hexamethylated 1-Halocarba-closo-dodecaborate Anions" Heteroatom Chemistry, 2006, 17, 217.

We claim:

1. A method for polymerizing a polymer precursor to form a polymer, comprising: contacting a polymer precursor with a lithium borane or heteroborane salt catalyst and an initiator and an optional reaction solvent under polymerizing conditions, wherein the polymer precursor is an unactivated terminal alkene or alkyne and the polymer precursor is an alkene or alkyne other than a lithium, borane or heteroborane which contains a terminal alkene or alkyne and wherein the borane anion of the lithium borane salt catalyst has the formula:

$$B_rH_{(r-z)}\cdot R_z^{\cdot 1-},$$

wherein r is an integer from 6 to 14 and z is an integer from 2 to r and each R, independent of each other R, is a linear or branched alkyl or a halogenated-linear or branched alkyl, the formula: $B_{12}R_{12}^{2-}$, where R is selected from a hydrogen or an alkyl group having from 1 to 10 carbon atoms, and the R's are the same or different, or the formula: $B_{10}R_{10}^{2-}$, where R is selected from a hydrogen or an alkyl group having from 1 to 10 carbon atoms, and the R's are the same or different; or wherein the heteroborane anion of the lithium heteroborane salt catalyst has the formula:

$$CB_pH_{(p+1)-y}R_y^{1-},$$

wherein p is an integer from 5 to 13 and y is an integer from 2 to p+1, and wherein each R, independent of each other R, is a linear or branched alkyl or a halogenated-linear or branched alkyl; and whereby the polymer formed by the contacting step is a polymer other than a polymer having two or more covalently attached lithium borane or heteroborane salts.

2. The method of claim 1, wherein the polymerizing conditions are low molecular weight producing polymerizing conditions and a low molecular weight polymer is formed.

3. The method of claim 1, wherein the polymerizing conditions are high molecular weight producing polymerizing conditions and a high molecular weight polymer is formed.

4. The method of claim 1, wherein the optional reaction solvent is present and is supercritical.

5. The method of claim 1, wherein the polymer precursor is a terminal alkene having 2 to 4 carbon atoms.

6. The method of claim 1, wherein the polymer precursor is selected from the group consisting of: $CH_2$=$C(R)(CR_2)_n$—$CR_3$; dienes; $CH_2$=$CH_2$;

$MeCH$=$CH_2$; $Me_2C$=$CH_2$; $EtCH$=$CH_2$; $PrCH$=$CH_2$; $BuCH$=$CH_2$; and $Me_3SiCH$=$CH_2$, where n is an integer and the R's are the same or different and are selected from the group consisting of: H, alkyl, halogenated alkyl, silylated alkyl, and halogen.

7. The method of claim 1, wherein the borane or heteroborane anion of the lithium borane or heteroborane salt catalyst has the formula $RC(BR)_9^-$, where R is selected from hydrogen or an alkyl group having from 1 to 10 carbon atoms, and the R's are the same or different.

8. The method of claim 1, wherein the borane or heteroborane anion of the lithium borane or heteroborane salt catalyst has the formula $RC(BR)_{11}^-$; where R is selected from a hydrogen or an alkyl group having from 1 to 10 carbon atoms, and the R's are the same or different.

9. The method of claim 1, wherein the borane or heteroborane anion of the lithium borane or heteroborane salt catalyst has the formula $B_{12}R_{12}^{2-}$, where R is selected from a hydrogen or an alkyl group having from 1 to 10 carbon atoms, and the R's are the same or different.

10. The method of claim 1, wherein the borane or heteroborane anion of the lithium borane or heteroborane salt catalyst has the formula $B_{10}R_{10}^{2-}$, where R is selected from a hydrogen or an alkyl group having from 1 to 10 carbon atoms, and the R's are the same or different.

11. The method of claim 1, wherein the borane or heteroborane anion of the lithium borane or heteroborane salt catalyst is selected from the group consisting of: $CB_{11}Me_{12}^-$; $HCB_{11}Et_9Me_2^-$; $CB_{11}HxEt_9Me_2^-$; $HCB_{11}Me_{11}^-$; and $CB_{11}H_{12}^-$, where Hx represents n-hexyl.

12. The method of claim 1, wherein the optional reaction solvent is present and is an alkane, cycloalkane or mixture thereof having from 1 to 10 carbon atoms.

13. The method of claim 1 wherein the polymers prepared have a terminal —$CH_2$—OH group.

14. The method of claim 1 wherein the polymer precursor is an unactivated terminal alkene having 2-10 carbon atoms.

15. The method of claim 1 wherein two or more different polymer precursors are polymerized and a copolymer is formed.

16. The method of claim 1 wherein the lithium borane or heteroborane salt catalyst is a lithium carborane salt.

17. The method of claim 16 wherein the carborane anion of the lithium carborane salt is selected from:

$HCB_{11}R'_{11-x}R''_x^-$, where x is 1-11 and R' and R'' are selected from hydrogen and alkyl groups wherein the alkyl groups having 1-10 carbon atoms; or $CB_{11}R'''R'_{11-x}R''_x^-$, where x is 1-11 and R''', R' and R'' are selected from hydrogen and alkyl groups having 1-10 carbon atoms and are different.

18. The method of claim 1 wherein the polymerization is conducted at ambient temperature or at a temperature between 50 and 100° C.

19. The method of claim 1 wherein the polymerization is conducted at ambient pressure.

20. The method of claim 1 wherein the polymerization is conducted at room temperature and atmospheric pressure.

21. The method of claim 1 wherein the polymerization is conducted at a temperature between 50 and 100° C. at ambient pressure.

22. The method of claim 1 wherein the polymer precursor is an unactivated terminal alkyne.

23. The method of claim 1 wherein the initiator is selected from the group consisting of air, oxygen, AIBN and other azo compounds, di-t-butyl peroxide and other peroxides, NO, and $NO_2$.

24. The method of claim 1, wherein the reaction solvent is present and is selected from the group consisting of: 1,2-dichloroethane; benzene, toluene; cyclohexane; alkanes; cycloalkanes; halogenated alkanes and cycloalkanes; sulfones; aromatic or aliphatic hydrocarbons; aromatic or aliphatic hydrocarbons substituted with one to six alkyl groups, halogens, or haloalkyl groups and mixtures thereof.

25. The method of claim 1 where in the contacting step a mixture of a first polymer precursor which is an unactivated terminal alkene and a second polymer precursor which is an activated alkene is contacted with the lithium salt of the anionic borane or heteroborane salt catalyst and the initiator and wherein the unactivated terminal alkene is an alkene other than a lithium carborane, borane or heteroborane polymer precursor which contains a terminal alkene.

26. The method of claim 25 wherein the second polymer precursor is an alkenyl acetate or an alkyl acrylate.

27. The method of claim 25 wherein the first polymer precursor is an unactivated terminal alkene having 2-10 carbon atoms.

28. The method of claim 25 wherein the second polymer precursor is vinyl acetate, ethyl acrylate or methyl methacrylate.

29. The method of claim 27 wherein the first polymer precursor is an unactivated terminal alkene having 2-10 carbon atoms.

30. The method of claim 29 wherein the first polymer precursor is ethylene, propylene, 1-butene, 1-pentene, 1-hexene, 1-heptene, or iso-butene.

31. The method of claim 25 wherein the polymerization is conducted at ambient temperature or at a temperature between 50 and 100° C.

32. The method of claim 25 wherein the polymerization is conducted at ambient pressure.

33. A method for polymerizing a polymer precursor, comprising:
   contacting a polymer precursor with a lithium carborane salt catalyst, an initiator and an optional reaction solvent under polymerizing conditions;
   wherein the polymer precursor is selected from ethylene, propylene, 1-butene, 1-pentene, 1-hexene, 1-heptene, iso-butene, isoprene, $Me_3SiCH=CH_2$, or $CH_2=CR-(CR_2)_n-CR_3$, where n is an integer and each R, independent of other R's in the molecule, are the same or different and are selected from the group consisting of: hydrogen, alkyl, silyl alkyl and halogen where alkyl groups have 1-10 carbon atoms; and
   wherein the carborane anion of the lithium carborane salt is selected from the group consisting of $CB_{11}R_{12}^-$, $CB_{11}Me_{12}^-$, $HCB_{11}Et_9Me_2^-$, $CB_{11}HxEt_9Me_2^-$, $HCB_{11}Me_{11}^-$; $CB_{11}H_{12}^-$, $HCB_{11}R'_{11-x}R''_x{}^-$, where x is 1-11 and R' and R" are selected from hydrogen and alkyl groups and are different, and
   $CB_{11}R'''R'_{11-x}R''_x{}^-$, where x is 1-11 and R''', R' and R" are selected from hydrogen and alkyl groups and are different; where Me, Et and Hx represent methyl, ethyl and n-hexyl groups, respectively, and wherein alkyl groups have 1-10 carbon atoms and whereby the polymer formed by the contacting step is a polymer other than a polymer having two or more covalently attached lithium borane or heteroborane salts.

34. The method of claim 33 wherein the polymerization is conducted at ambient temperature or at a temperature between 50 and 100° C.

35. The method of claim 33 wherein the polymerization is conducted at ambient pressure.

* * * * *

UNITED STATES PATENT AND TRADEMARK OFFICE
CERTIFICATE OF CORRECTION

PATENT NO. : 7,737,234 B2  Page 1 of 1
APPLICATION NO. : 11/997895
DATED : June 15, 2010
INVENTOR(S) : Josef Michl, Kamesh Vyakaranam and Stefanie Koerbe It is certified that error appears in the above-identified patent and that said Letters Patent is hereby corrected as shown below:

On The Title Page, Item (86), please replace "PCT/US2006/003047" with --PCT/US2006/030470--.

Signed and Sealed this

Twenty-first Day of December, 2010

David J. Kappos
*Director of the United States Patent and Trademark Office*